(12) United States Patent
Heverly et al.

(10) Patent No.: US 11,267,561 B2
(45) Date of Patent: Mar. 8, 2022

(54) VIBRATION ATTENUATOR

(71) Applicant: Bell Textron Inc., Fort Worth, TX (US)

(72) Inventors: David Heverly, Arlington, TX (US); Frank Bradley Stamps, Colleyville, TX (US); Jouyoung Jason Choi, Southlake, TX (US); Michael R. Smith, Southlake, TX (US); Thomas C. Parham, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 126 days.

(21) Appl. No.: 16/664,675

(22) Filed: Oct. 25, 2019

(65) Prior Publication Data

US 2020/0130820 A1 Apr. 30, 2020

Related U.S. Application Data

(60) Provisional application No. 62/750,790, filed on Oct. 25, 2018.

(51) Int. Cl.
*B64C 27/00* (2006.01)
*B64C 11/00* (2006.01)

(52) U.S. Cl.
CPC .......... *B64C 27/001* (2013.01); *B64C 11/008* (2013.01); *B64C 2027/003* (2013.01)

(58) Field of Classification Search
CPC ..... B64C 11/08; B64C 27/001; B64C 27/008; B64C 2027/002; B64C 2027/003; B64C 2027/004

See application file for complete search history.

(56) References Cited

U.S. PATENT DOCUMENTS

| | | | | |
|---|---|---|---|---|
| 2,186,199 A | * | 1/1940 | Martin | B64C 11/008 416/145 |
| 3,219,120 A | * | 11/1965 | William | F16F 15/22 416/145 |
| 6,210,099 B1 | * | 4/2001 | Hugbart | F16F 15/36 415/119 |
| 2009/0236468 A1 | * | 9/2009 | Welsh | H02K 7/14 244/17.13 |

* cited by examiner

*Primary Examiner* — Joshua J Michener
*Assistant Examiner* — Colin Zohoori
(74) *Attorney, Agent, or Firm* — Lightfoot & Alford PLLC

(57) ABSTRACT

A vibration attenuator for a rotor of an aircraft has a track housing adapted for rotation relative to the rotor and configured for rotation at a second angular velocity greater than a first angular velocity of the rotor. A track is located within the track housing and has a reaction surface, a pair of weights being configured for movement within the track and in contact with the reaction surface. A stop assembly has a pair of stops spaced 180 degrees apart, the stops separating the weights from each other, and each weight being allowed to travel within the track between the stops. A motor rotates the track housing relative to the rotor. The weights are free to travel relative to each other between a minimum-force configuration, in which the weights are positioned 180 degrees apart, and a maximum-force configuration, in which both weights are adjacent one of the stops.

20 Claims, 35 Drawing Sheets

VIBRATION ATTENUATOR

CROSS-REFERENCE TO RELATED APPLICATIONS

This application claims priority to U.S. Provisional Patent Application No. 62/750,790, filed on 25 Oct. 2019 by David Heverly, et al., and titled "Vibration Attenuator," the disclosure of which is incorporated by reference in its entirety.

STATEMENT REGARDING FEDERALLY SPONSORED RESEARCH OR DEVELOPMENT

Not applicable.

BACKGROUND

Rotary-wing aircraft, such as helicopters and tiltrotors, have at least one rotor for providing lift and propulsion forces, and these rotors have at least two airfoil blades connected to a rotatable hub. The rotor blades cause vibrations that are a function of the rotational speed of the rotor, and aircraft designers have difficulty accurately predicting the exact vibration modes that a particular rotor configuration will encounter. The vibrations, which can be caused by shear and/or moment forces, can be transmitted through the rotor mast, through associated powertrain components, and into the airframe of the aircraft. The vibrations can reduce the life of affected components and cause undesirable vibrations for passengers. Various types of vibration attenuation systems have been developed to reduce or eliminate these vibrations. The conventional systems can include airframe- and mast-mounted vibration attenuators.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Mast- or hub-mounted vibration attenuators are disclosed herein for reducing vibrations by producing a whirling shear force opposing a whirling shear force created during operation of an aircraft rotor. The attenuator rotates relative to the rotor and has at least two masses, which are passively or actively positionable to configurations between and including a minimum-force configuration, which produces a small shear force or no shear force, and a maximum-force configuration.

Figure 1:
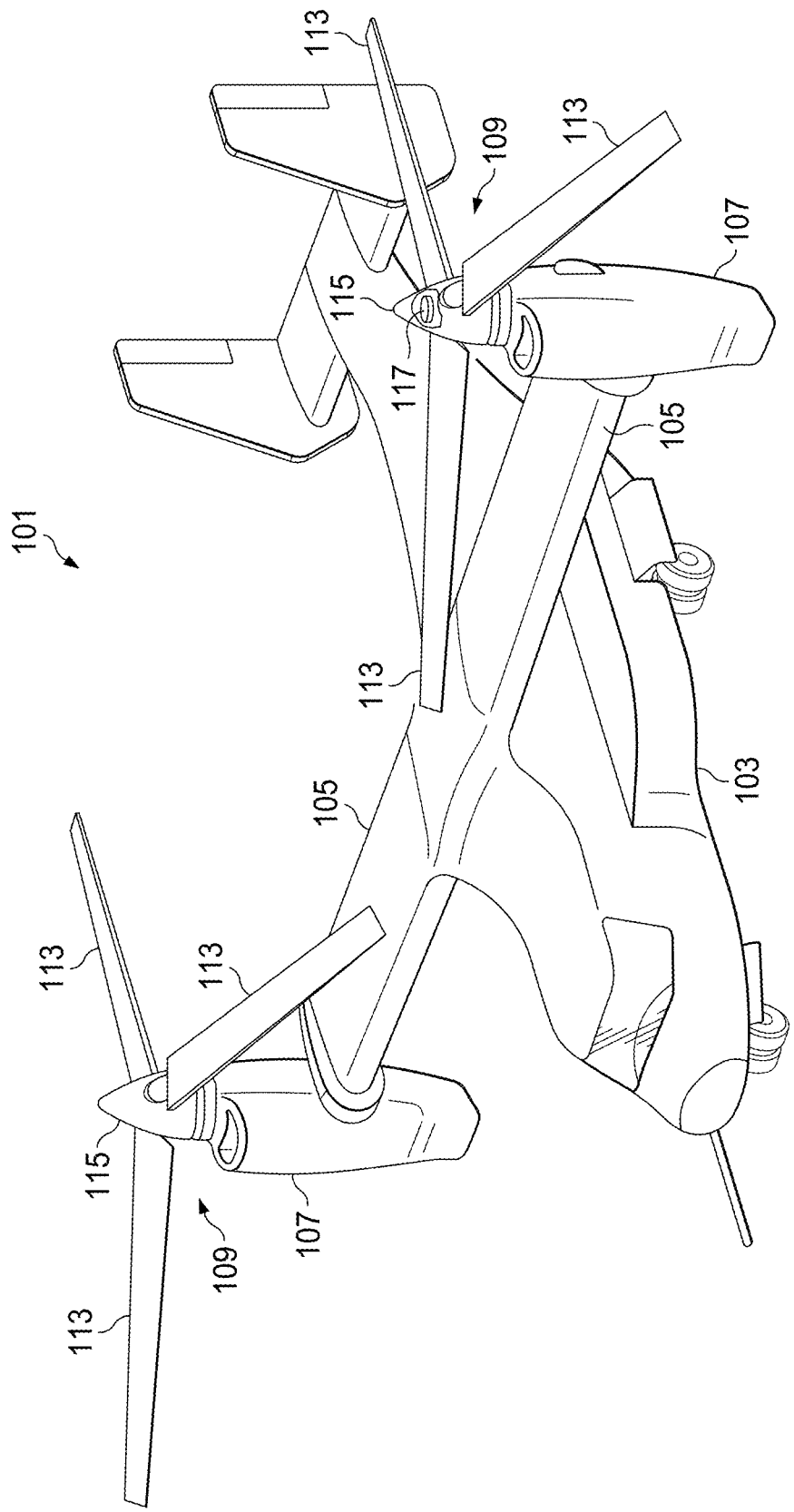
FIG. 1 is an oblique view of an aircraft comprising a vibration attenuator according to this disclosure.

FIG. 1 is an oblique view of a tiltrotor aircraft 101. Tiltrotor aircraft 101 comprises a fuselage 103 with a fixed wing 105 extending therefrom. A rotatable nacelle 107 is located at each end of wing 105, and each nacelle 107 houses a powerplant for driving an attached proprotor 109 in rotation. Each proprotor 109 has a cover 115 enclosing a rotor hub, and a plurality of blades 113 extend from the rotor hub. The position of nacelles 107, as well as the pitch of blades 113, can be selectively controlled to selectively control direction, thrust, and lift of proprotors 109. Each proprotor 109 has a vibration attenuator 117 coupled to the associated rotor hub and housed within cover 115.

Figure 2:
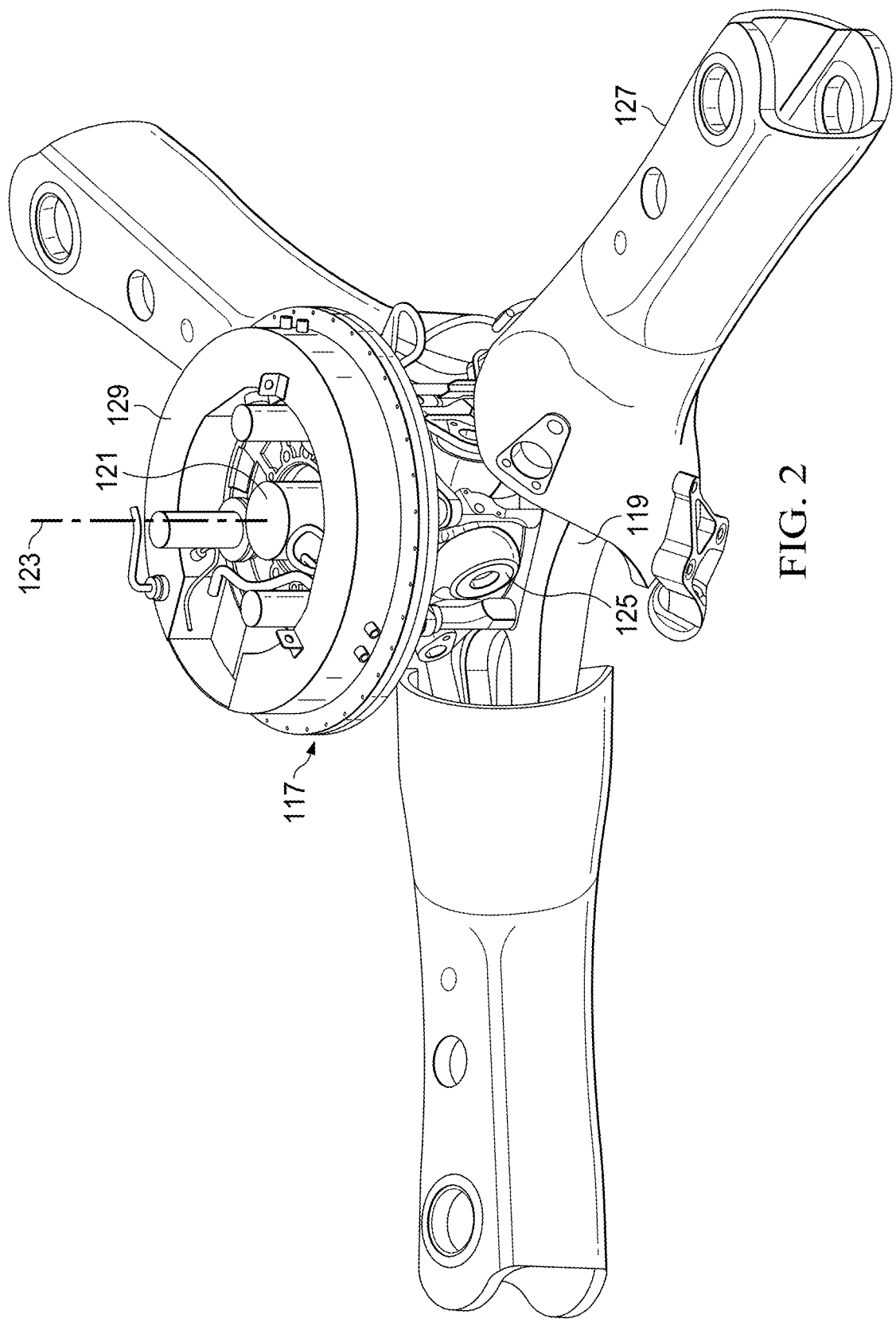
FIG. 2 is an oblique view of a rotor hub assembly of the aircraft of FIG. 1 with a vibration attenuator according to this disclosure installed thereon.
Figure 3:
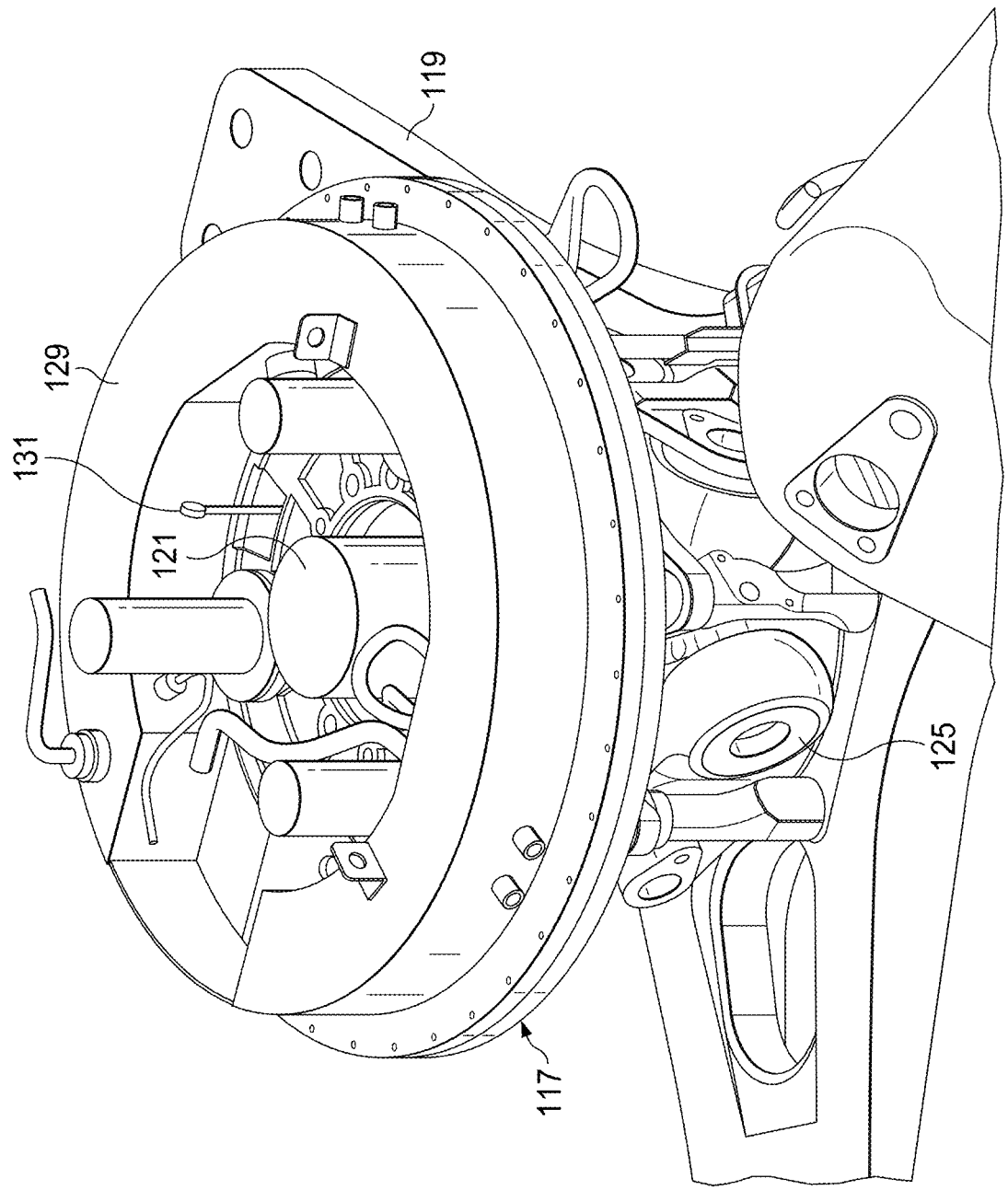
FIG. 3 is an enlarged view of a portion of the rotor hub assembly of FIG. 2 with components removed.
Figure 4:
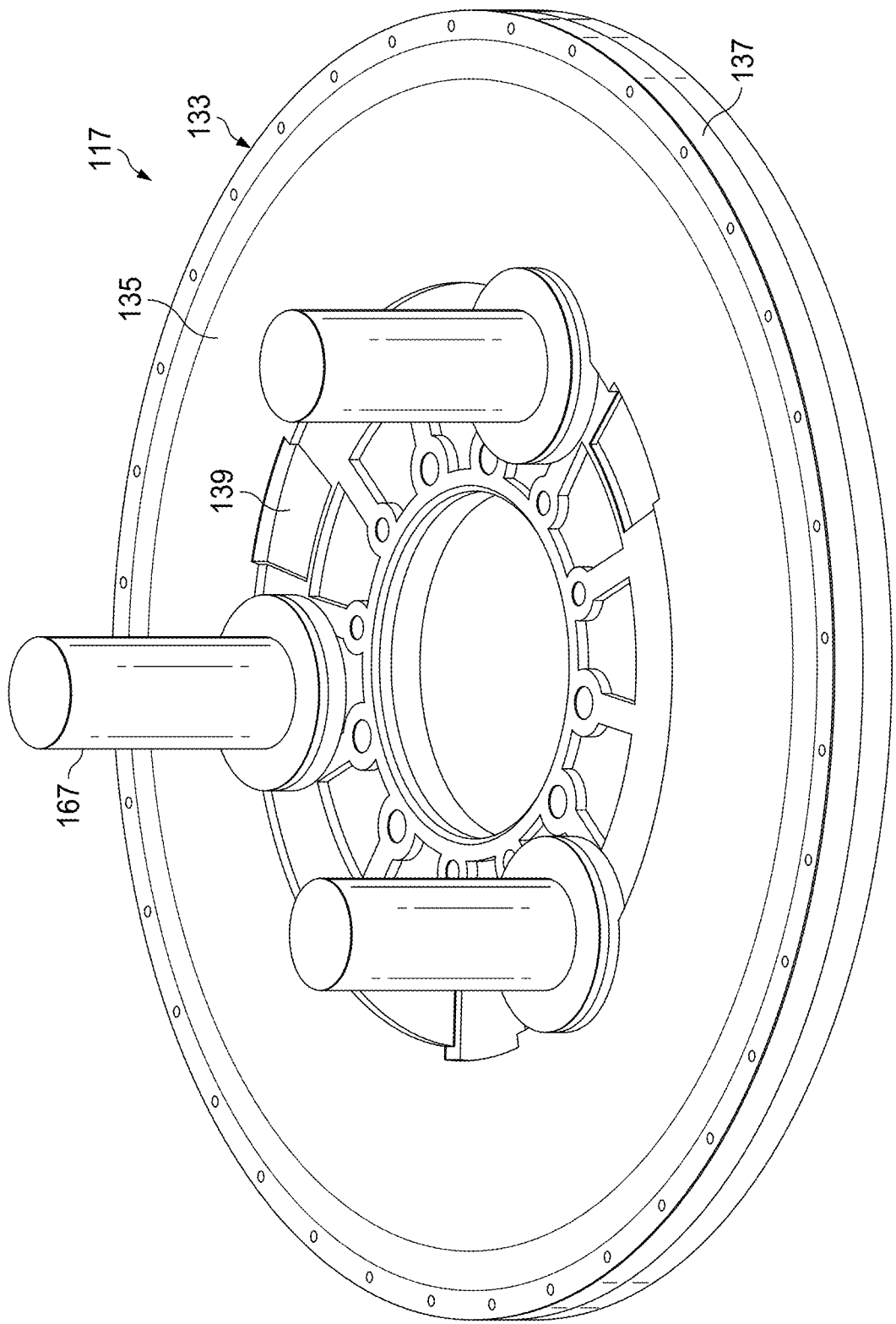
FIG. 4 is an oblique view of the vibration attenuator of FIG. 2.
Figure 5:
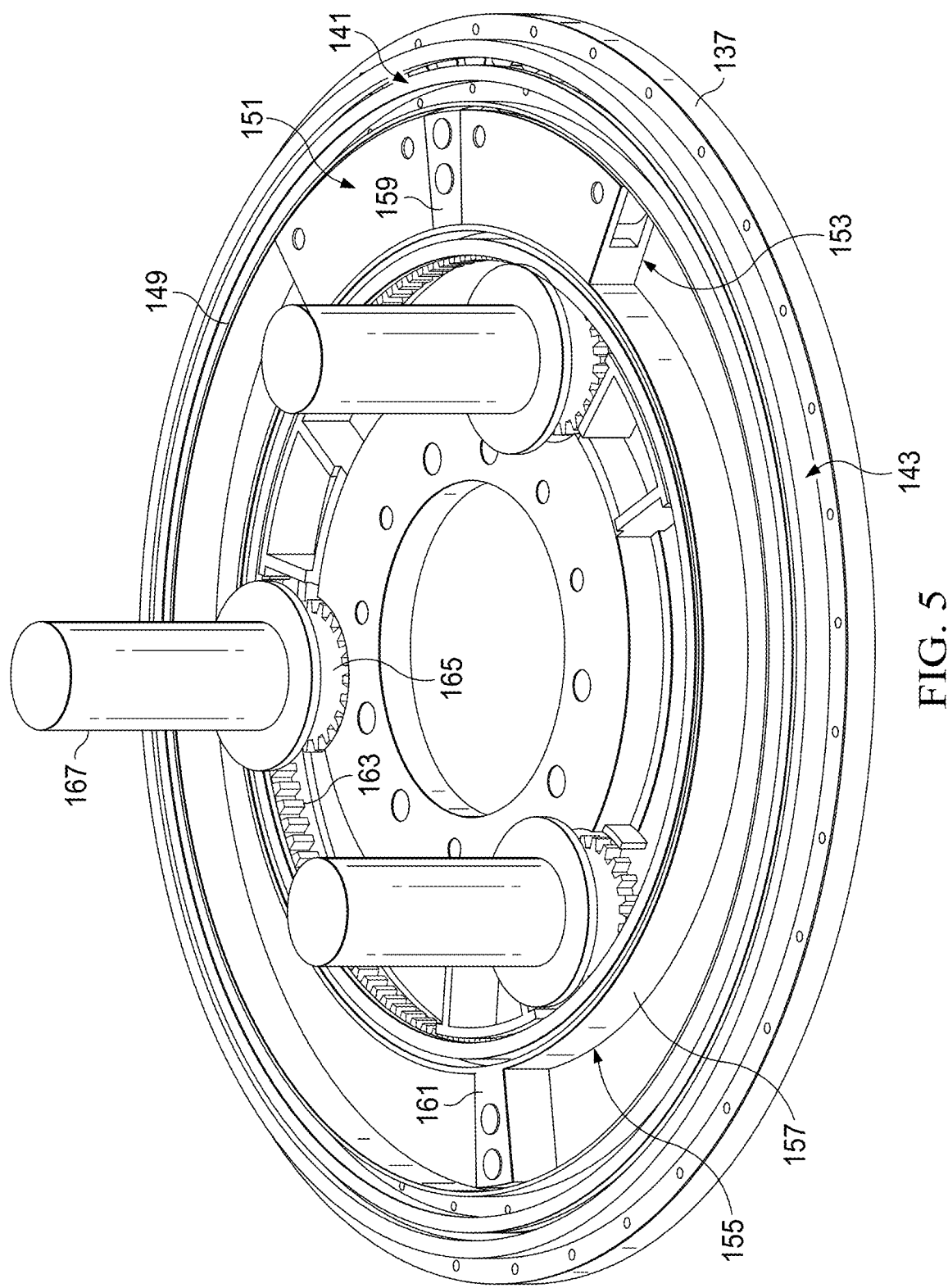
FIG. 5 is an oblique view of the vibration attenuator of FIG. 2 with components removed.
Figure 6:
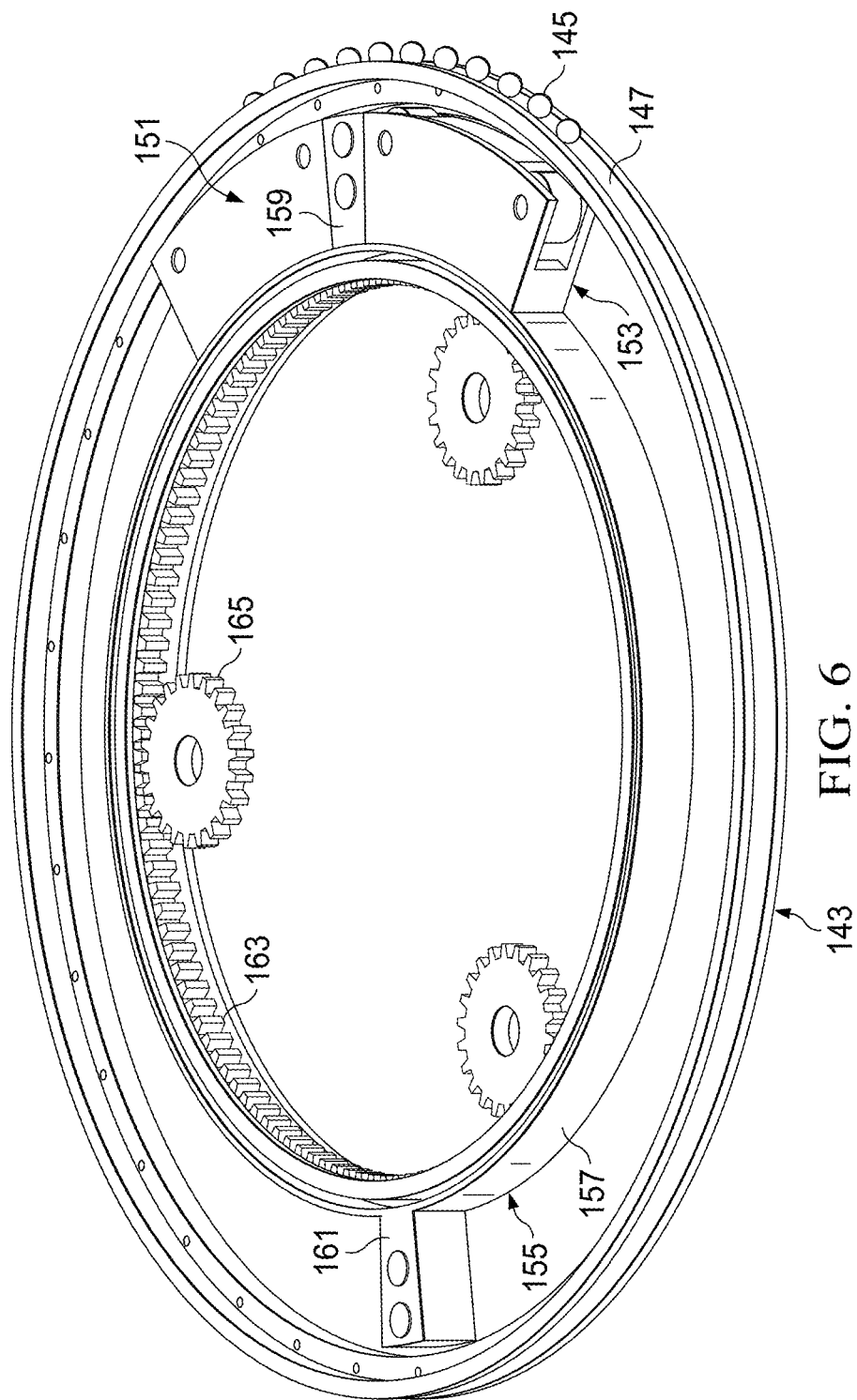
FIG. 6 is an oblique view of the vibration attenuator of FIG. 2 with additional components removed.

FIGS. 2 and 3 are oblique views of the rotor hub assembly of aircraft 101. A central yoke 119 is coupled to mast 121 for rotation therewith about mast axis 123. In the embodiment shown, yoke 119 is coupled to mast 121 by a constant-velocity gimbal system 125, allowing yoke 119 to gimbal relative to mast 121. Grips 127 are rotatably coupled to yoke 119 and configured to couple blades 113 to yoke 119. Vibration attenuator 117 is coupled to either mast 121 or to yoke 119 for rotation together with mast 121 and yoke 119 about mast axis 123, and a power distribution ring 129 is installed on attenuator 117 for distributing electrical power to components of rotor 109. Three rods 131 extend through attenuator 117 and ring 129 to provide for measurement of the gimbal angle. Attenuator 117 and components thereof are shown in isolation in FIGS. 4 through 7.

Referring now to FIGS. 4 through 7, attenuator 117 has an outer cover 133 comprising upper plate 135 and lower plate 137, and apertures 139 allow for rods 131 to extend therethrough from below lower plate 137. When assembled, plates 135, 137 are fastened together and coupled to yoke 119 or mast 121 for rotation together therewith at an angular velocity of 1 revolution for every 1 revolution of rotor 109 (1/rev relative to the aircraft). Within cover 133, a rotating weight system 141 is capable of rotation at a different angular velocity than that of cover 133, and the preferred velocity of system 141 is 3/rev.

Rotating weight system 141 comprises an inner plate 143 that is rotatable relative to lower plate 137 via ball bearings 145 (some shown) on bearing track 147 around the periphery of plate 143. An outer ring 149 is mounted to plate 143 for rotation therewith and provides a circumferential reaction surface for reacting the centrifugal force of coplanar rolling weight assemblies 151, 153. An inner ring 155 is also mounted to plate 143 and comprises a ring portion 157 and two stops 159, 161 to form a stop assembly. Ring portion 157 and outer ring 149 cooperate to define a coaxial track for movement of weight assemblies 151, 153 within the track. A ring gear 163 is mounted to the inner surface of ring portion 157 for being driven by a gear 165 on each of three motors 167, and weight assemblies 151, 153 are capable of travel along outer ring 149 between stops 159, 161. Oil may optionally be located in the volume within cover 133, and dampers or springs may optionally be installed to help tune the motions of weight assemblies 151, 153. While shown with three motors 167, attenuator 117 may have more or fewer motors 167.

Figure 7:
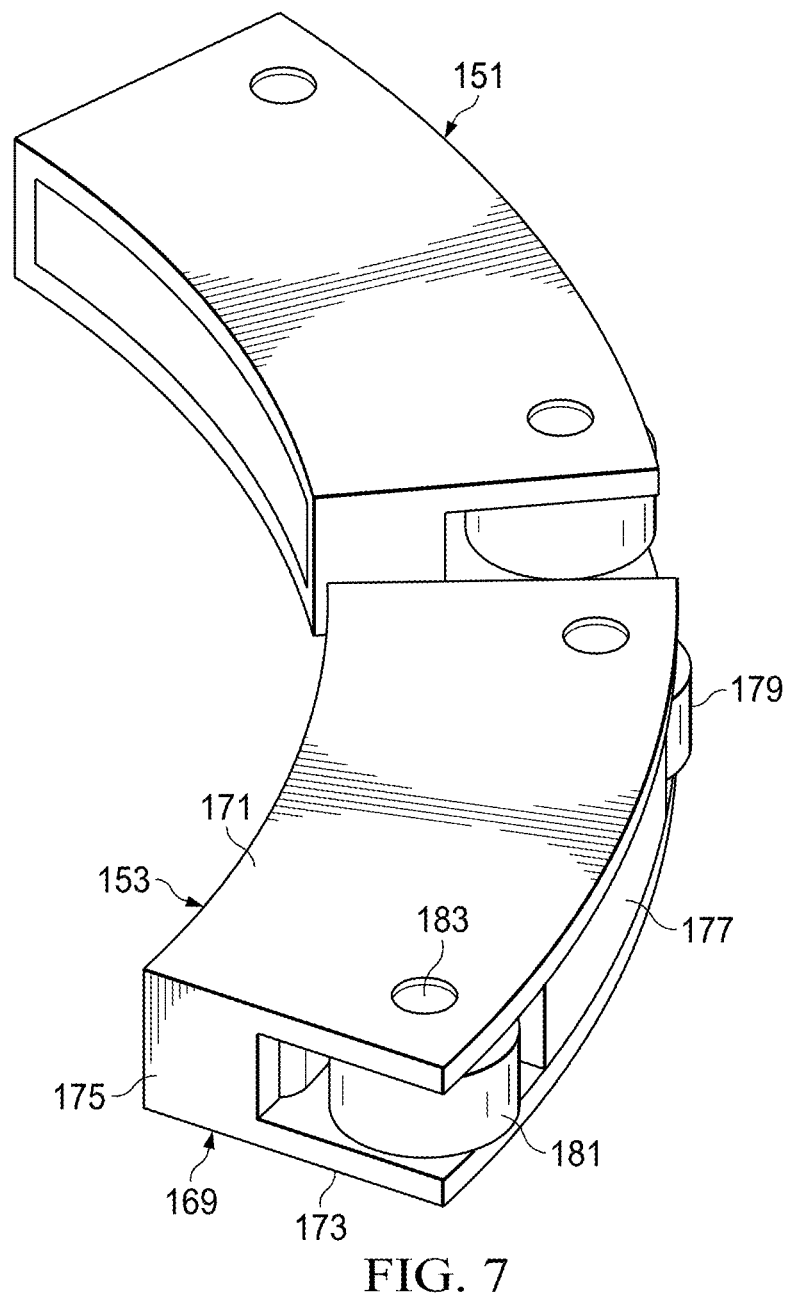
FIG. 7 is an oblique view of weights of the vibration attenuator of FIG. 2.

FIG. 7 illustrates weight assemblies 151, 153, which are preferably identical. Each assembly 151, 153 comprises a body 169 comprising an upper plate 171 and a lower plate 173, plates 171, 173 being spaced from each other by side plates 175. In the embodiment shown, a T-shaped weight 177 is located between plates 171, 173, and wheels 179, 181 are located at outer corners of plates 171, 173, each wheel 179, 181 being capable of rotation relative to plates 171, 173 about an axle 183. As shown, wheels 179, 181 are positioned to slightly protrude radially outward of the periphery of plates 171, 173, allowing weight assemblies 151, 153 to roll along outer ring 149. Though shown as cylindrical, wheels 179, 181 may have alternative shapes, such as, for example, spherical peripheries for reducing friction with the reaction surface of outer ring 149.

During operation, cover 133 rotates with rotor 109 at 1/rev, and motors 167 drive inner plate 143, outer ring 149, and inner ring 155 at a different angular velocity n/rev, such as, for example, 3/rev. As the angular velocity increases from a standstill at startup, the inertia of weight assemblies 151, 153 causes each of assemblies 151, 153 to be contacted by one of stops 159, 161, positioning assemblies 151, 153 180 degrees apart, thereby being balanced about the axis of rotation. This corresponds to a minimum-force configuration for producing little or no shear force. As rotor operation continues and weight system 141 reaches the desired n/rev velocity, weight assemblies 151, 153 are free to travel between stops 159, 161 to balance a shear force produced by rotor 109. A maximum-force configuration occurs when weight assemblies 151, 153 are in the positions shown, with both assemblies 151, 153 located against one of stops 159, 161. If motors 167 are stopped for any reason, such as a power failure or commanded shutdown, the angular velocity of weight system 141 decreases to 1/rev. The momentum of weight assemblies 151, 153 causes each of assemblies 151, 153 to be contacted by the other of stops 159, 161, positioning them again as 180 degrees apart (but on the opposite sides of stops 159, 161), thereby being balanced again about the axis of rotation. Depending on the selected order of operations, the same balance process preferably occurs as rotor 109 decreases angular velocity during shutdown.

Figure 8:
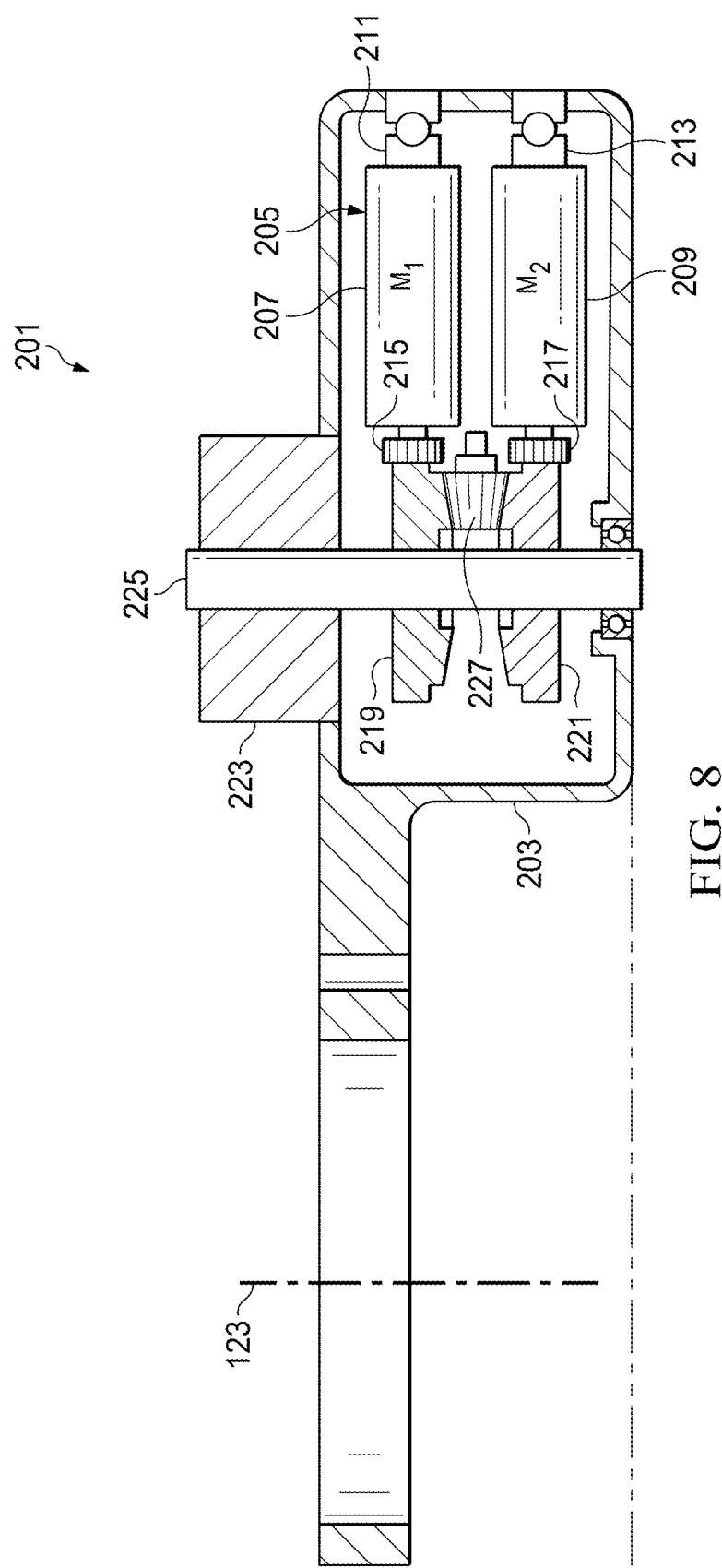
FIG. 8 is a side cross-section view of an alternative embodiment of a vibration attenuator according to this disclosure.

FIG. 8 illustrates an alternative embodiment of a vibration attenuator according to this disclosure. Attenuator 201 comprises a cover 203 enclosing toroidal volume housing a weight system 205, cover 203 being configured for coupling to yoke 119 or mast 121 for rotation together therewith. System 205 comprises two weights 207, 209 that are rotatable relative to each other and cover 203 on bearings 211, 213, respectively. Each weight 207, 209 has a circumferential ring gear 215, 217, respectively, located on a radially inward surface. Gears 219, 221 each engage an associated ring gear 215, 217 and are driven by motor 223 via shaft 225 for rotating weights 207, 209 within cover 203. A spider gear 227 provides a differential capability to allow for angular movement of weights 207, 209 relative to each other while weights 207, 209 are being driven by motor 223. This relative motion can be passive or actively controlled by providing another motor to control the rotational position of spider gear 227 or by controlling the position of gears 219, 221 on shaft 225. As shown, weights 207, 209 are angularly aligned within cover 203, corresponding to a maximum-force configuration, whereas a minimum-force configuration positions weights 207, 209 on opposite sides of cover 203 at 180 degrees from each other.

This configuration allows the single motor 223 to spin weights 207, 209 at an average angular velocity and at a determined phase while the relative positions of weights 207, 209 can vary, as needed, between a 0-degree offset, corresponding to a maximum-force configuration, and a 180-degree offset, corresponding to a minimum-force configuration. This provides for the passive adjustment of the force output to balance the forcing vibration. Hard stops can be installed to keep weights 207, 209 from moving past each other to other than the required 0 to 180-degree phasing. Damping of some form, such as, for example, oil between the weights may also be desired. A spring could also be used to keep the weights at 180 degrees apart unless reacting to a forcing function load at n/rev.

In operation, attenuator 201 is rotated with rotor 109 at 1/rev, and motor 223 causes weights 207, 209 to rotate within cover 203 at a selected angular velocity, such as, for example, 3/rev. Weights 207, 209 may then passively move relative to each other or be actively commanded to a selected relative angular position to produce a shear force for attenuating a vibration.

Figure 9:
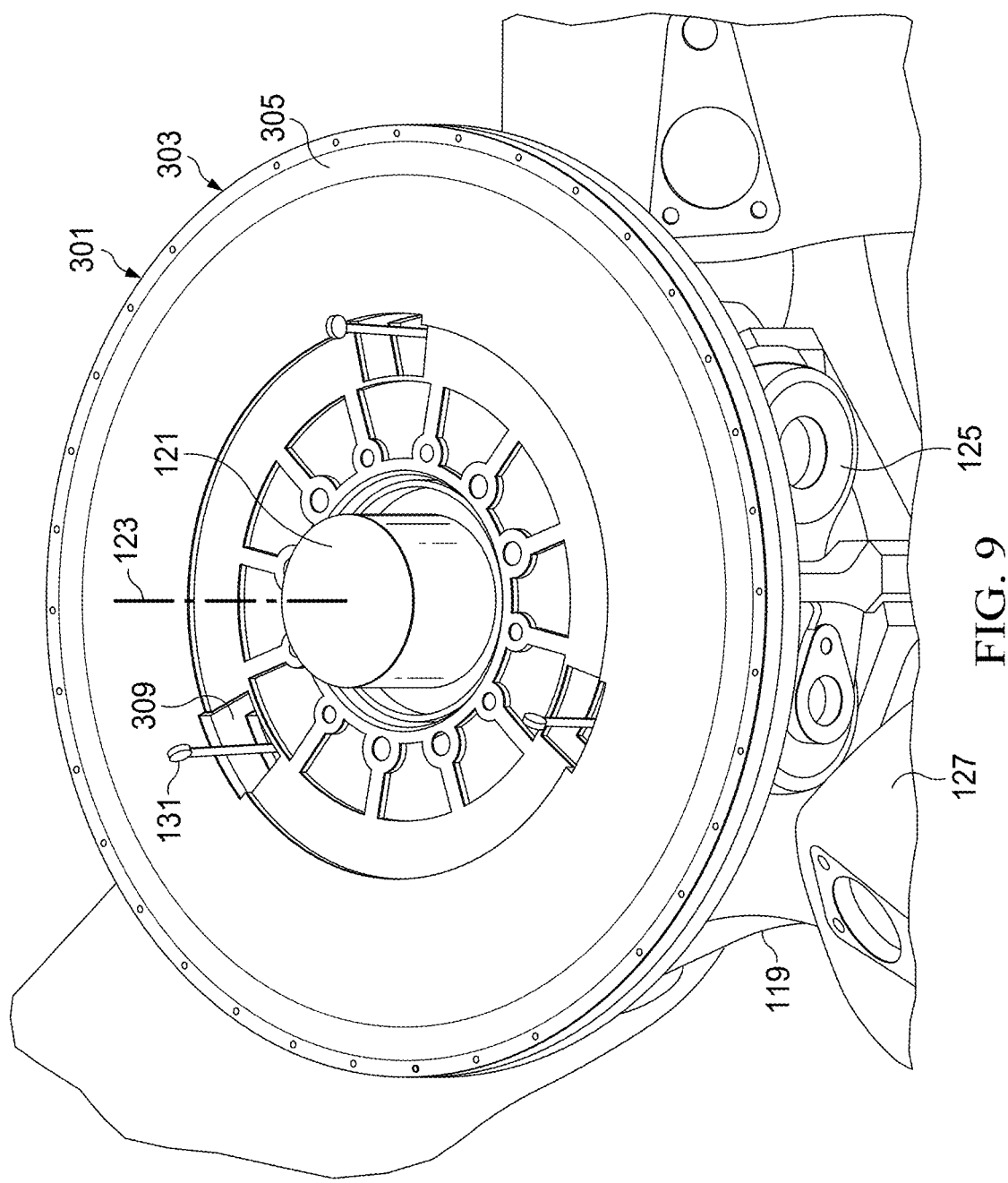
FIG. 9 is an oblique view of another alternative embodiment of a vibration attenuator according to this disclosure.
Figure 10:
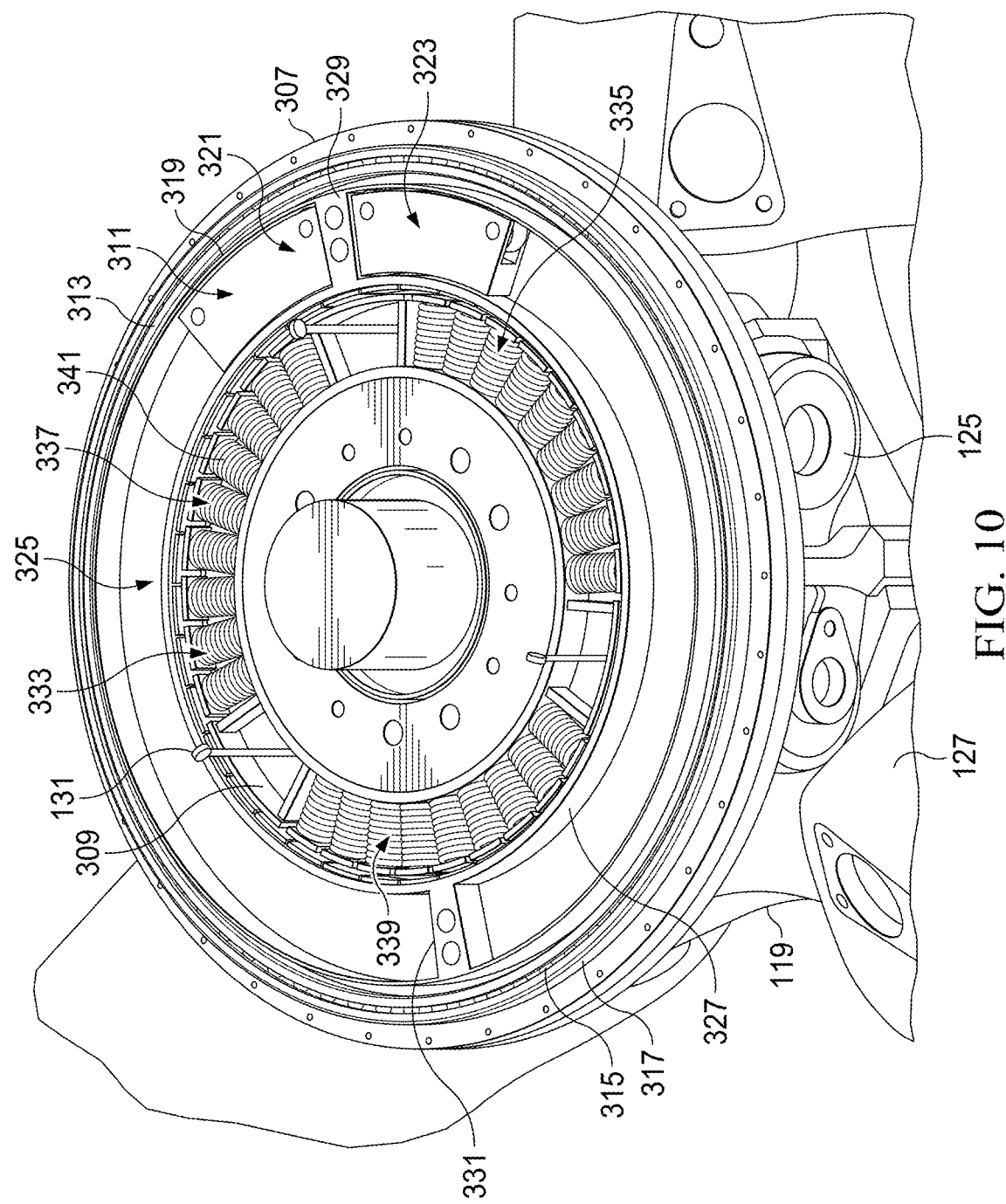
FIG. 10 is an oblique view of the attenuator of FIG. 9 with components removed.
Figure 11:
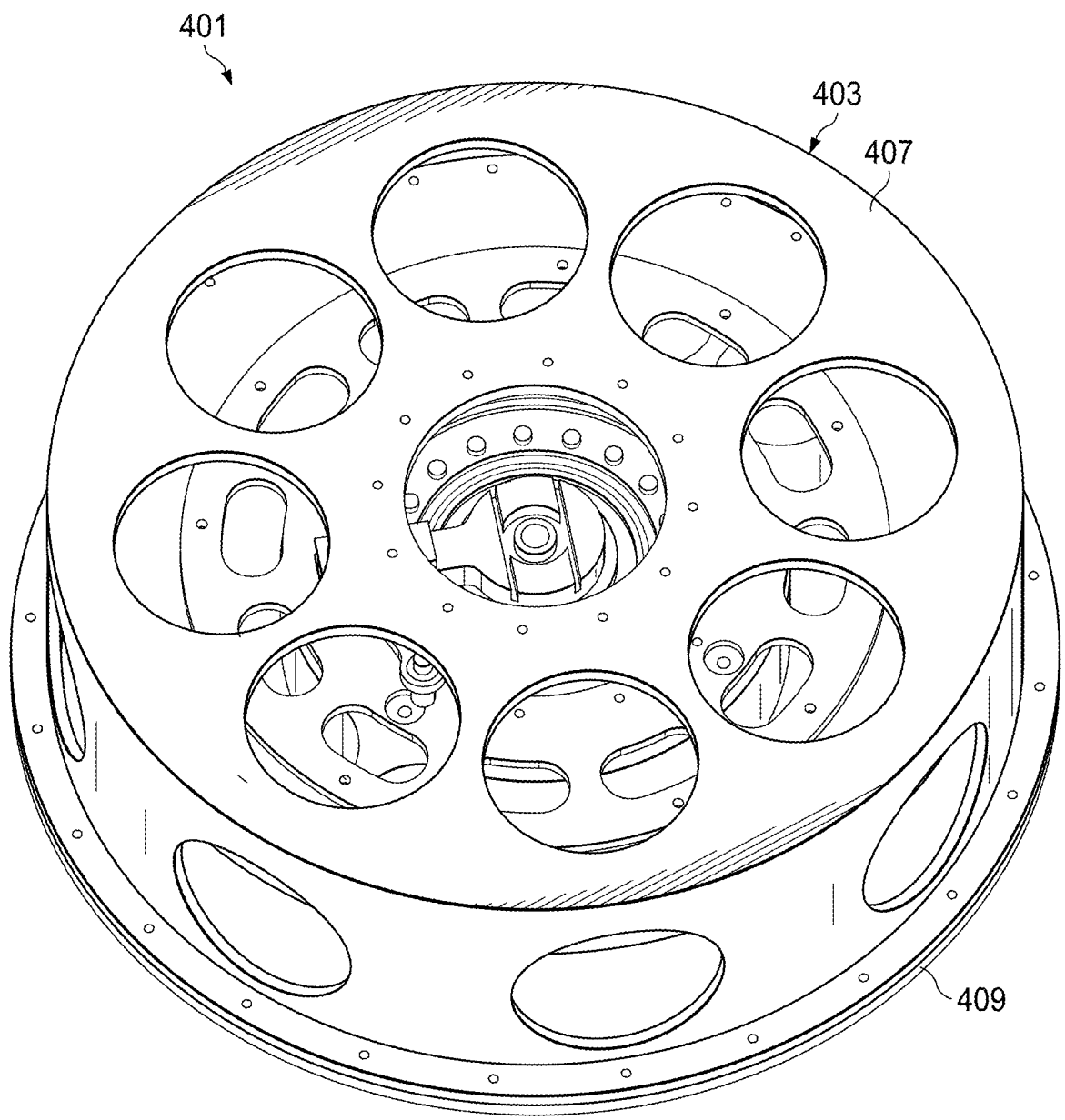
FIG. 11 is an oblique view of another embodiment of an attenuator according to this disclosure.
Figure 12:
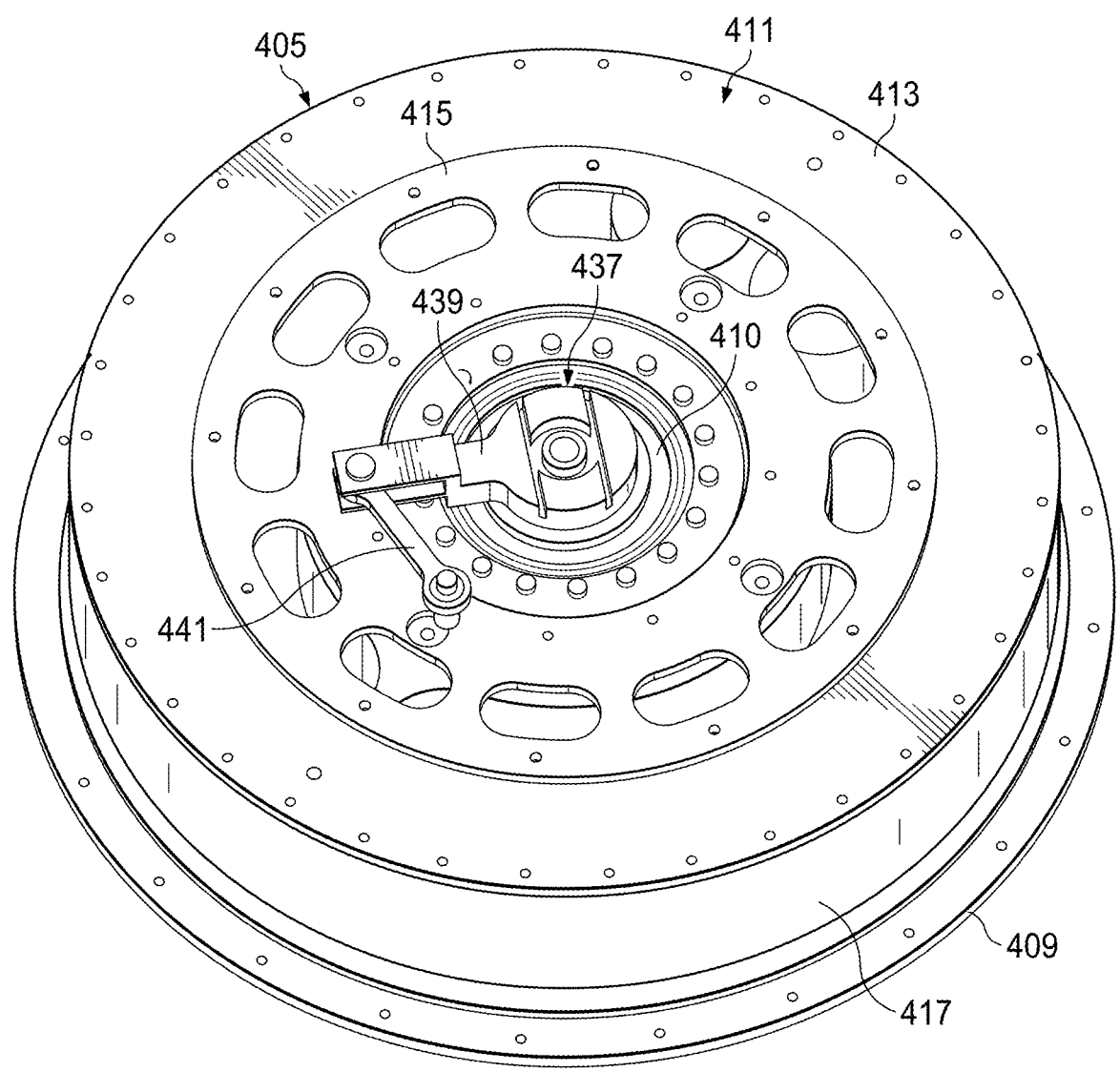
FIG. 12 is an oblique view of the attenuator of FIG. 11 with components removed.
Figure 13:
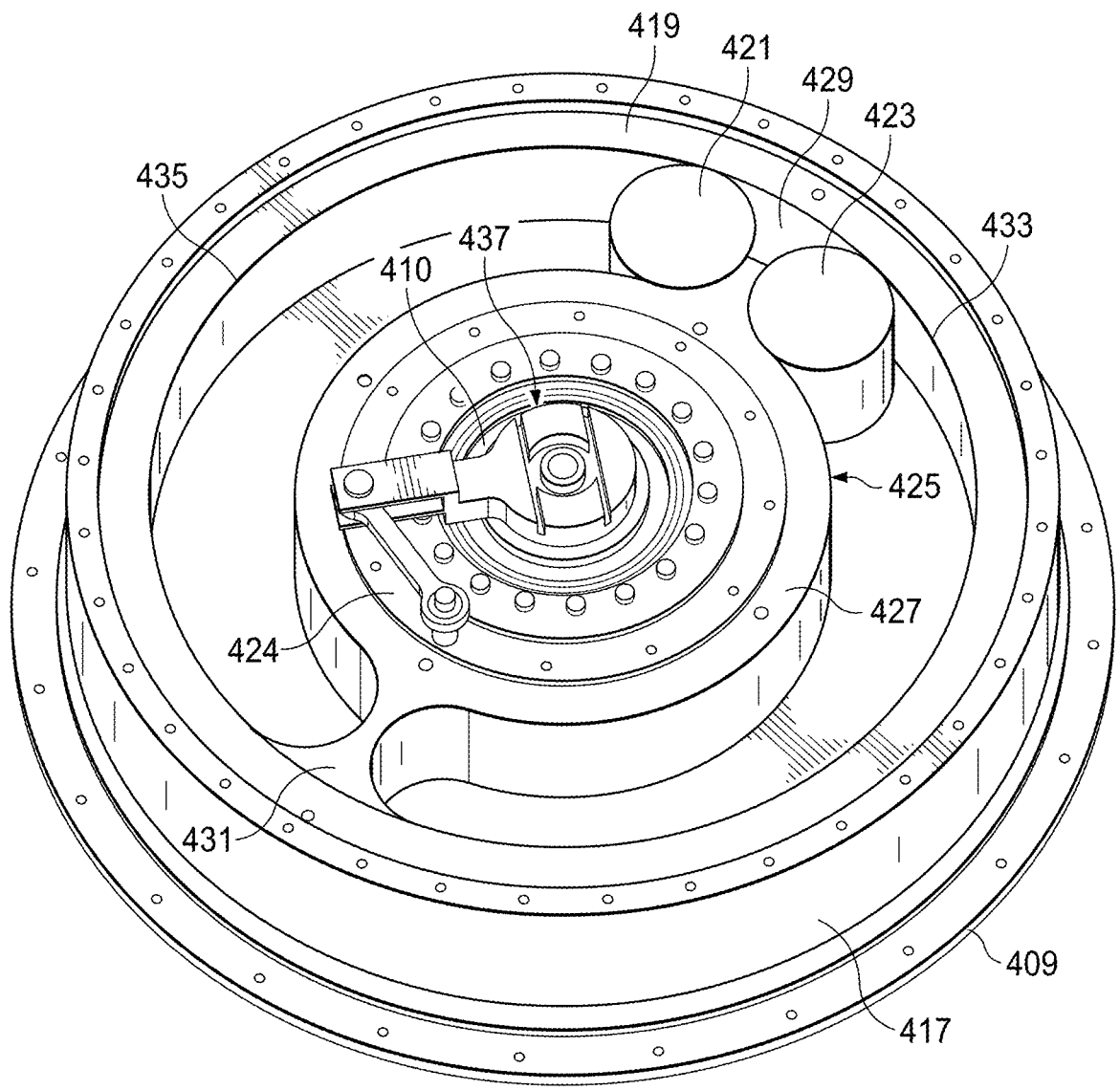
FIG. 13 is an oblique view of the attenuator of FIG. 11 with components removed.
Figure 14:
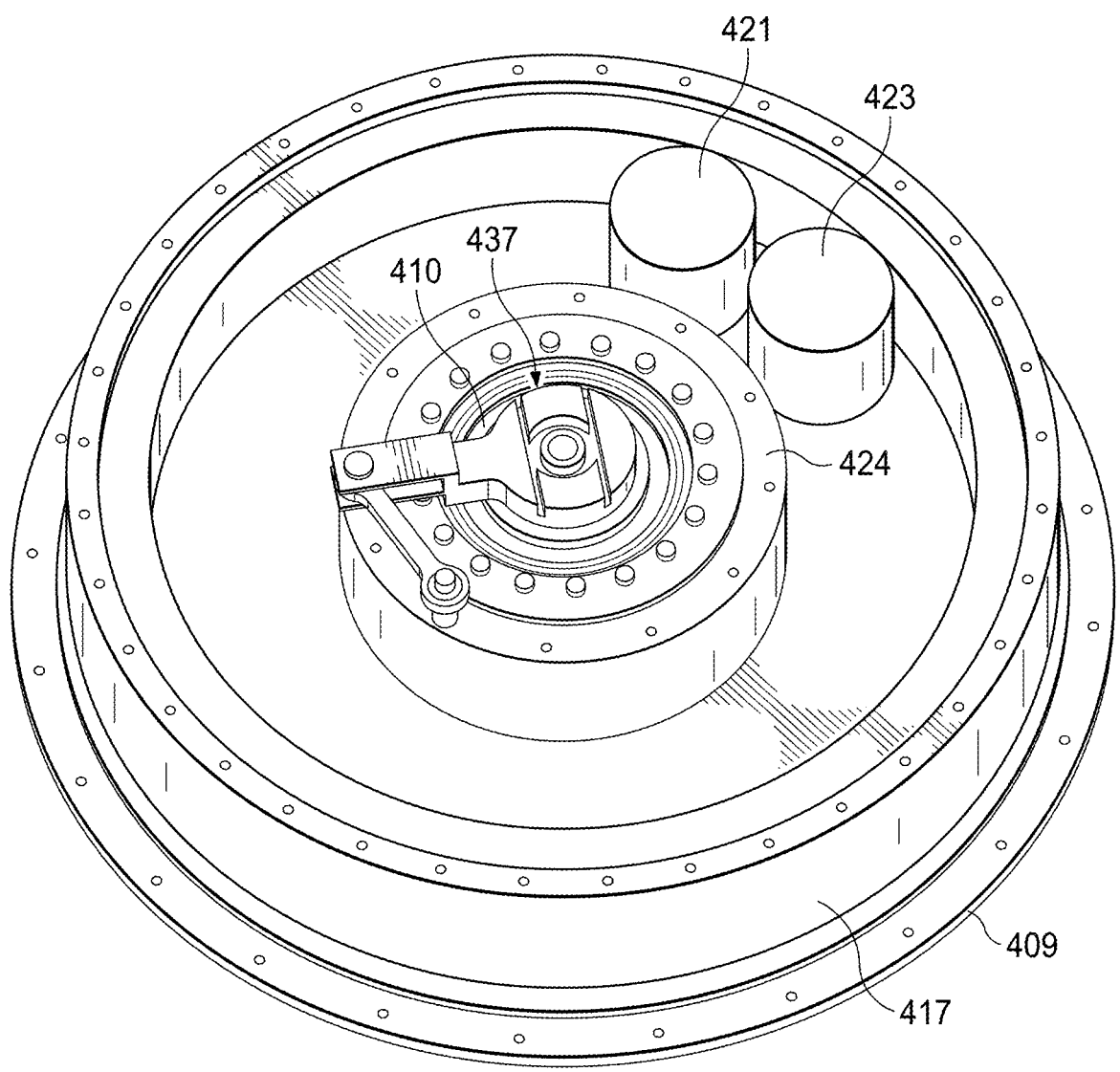
FIG. 14 is an oblique view of the attenuator of FIG. 11 with components removed.
Figure 15:
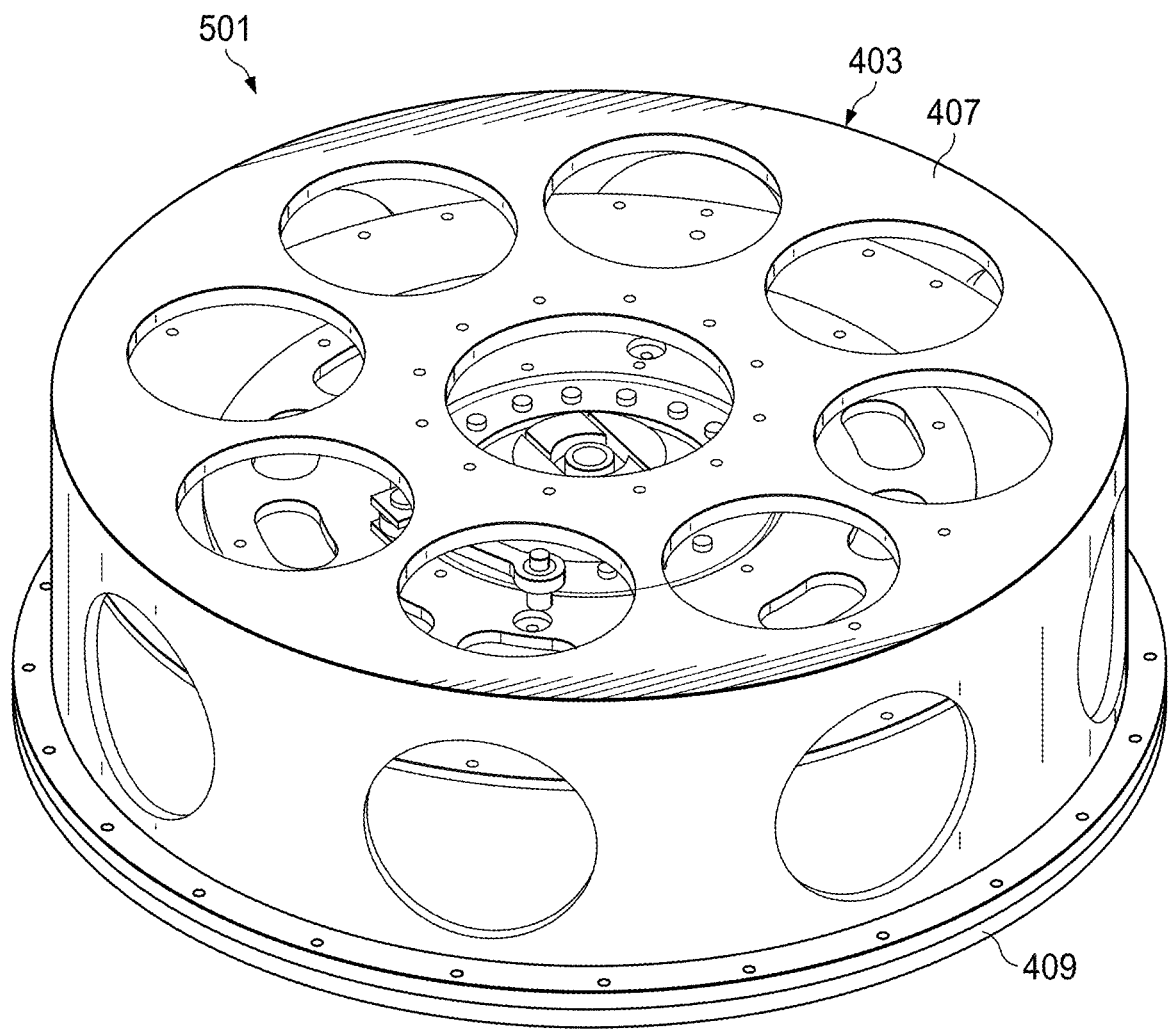
FIG. 15 is an oblique view of another embodiment of an attenuator according to this disclosure.
Figure 16:
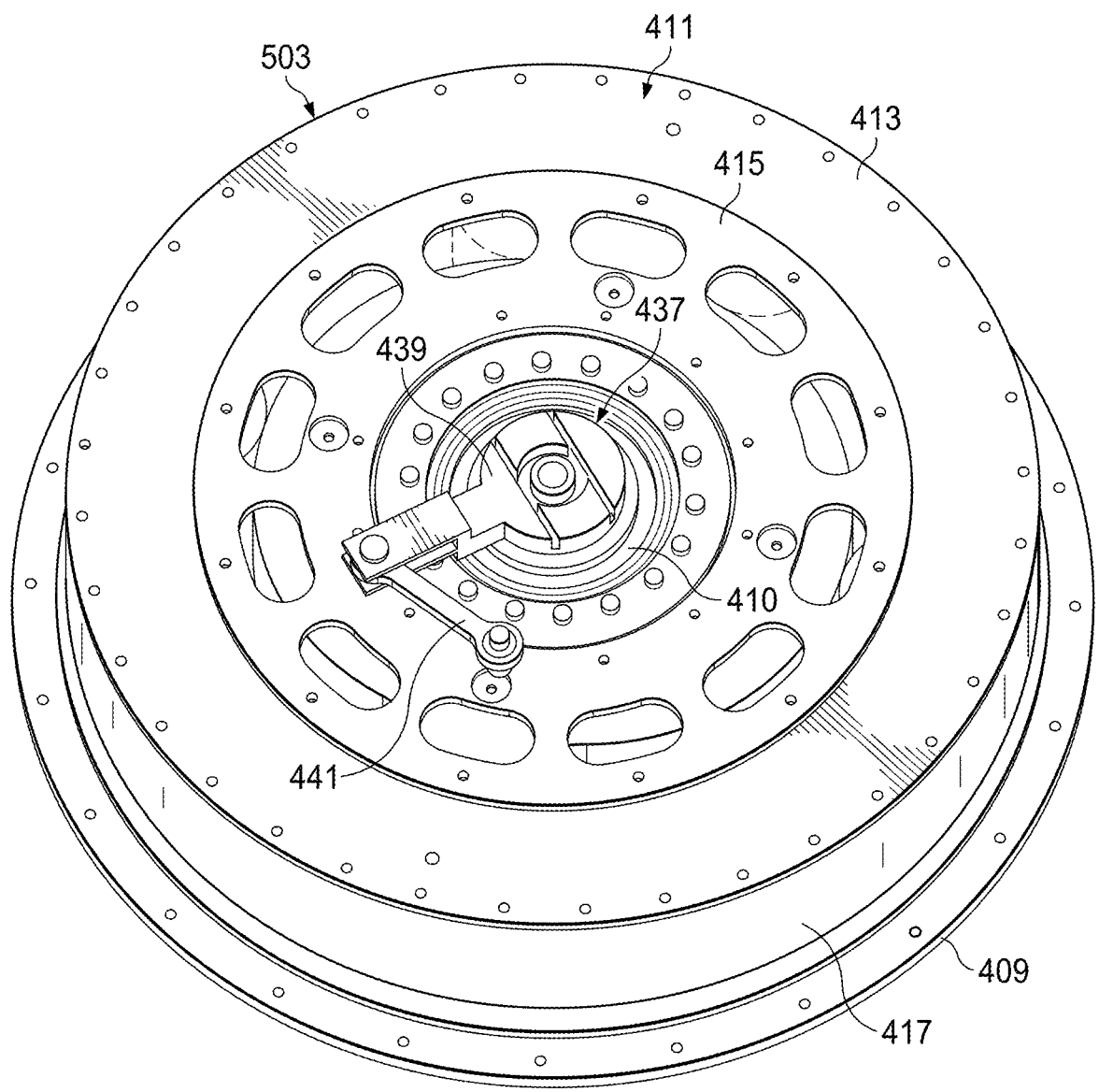
FIG. 16 is an oblique view of the attenuator of FIG. 15 with components removed.
Figure 17:
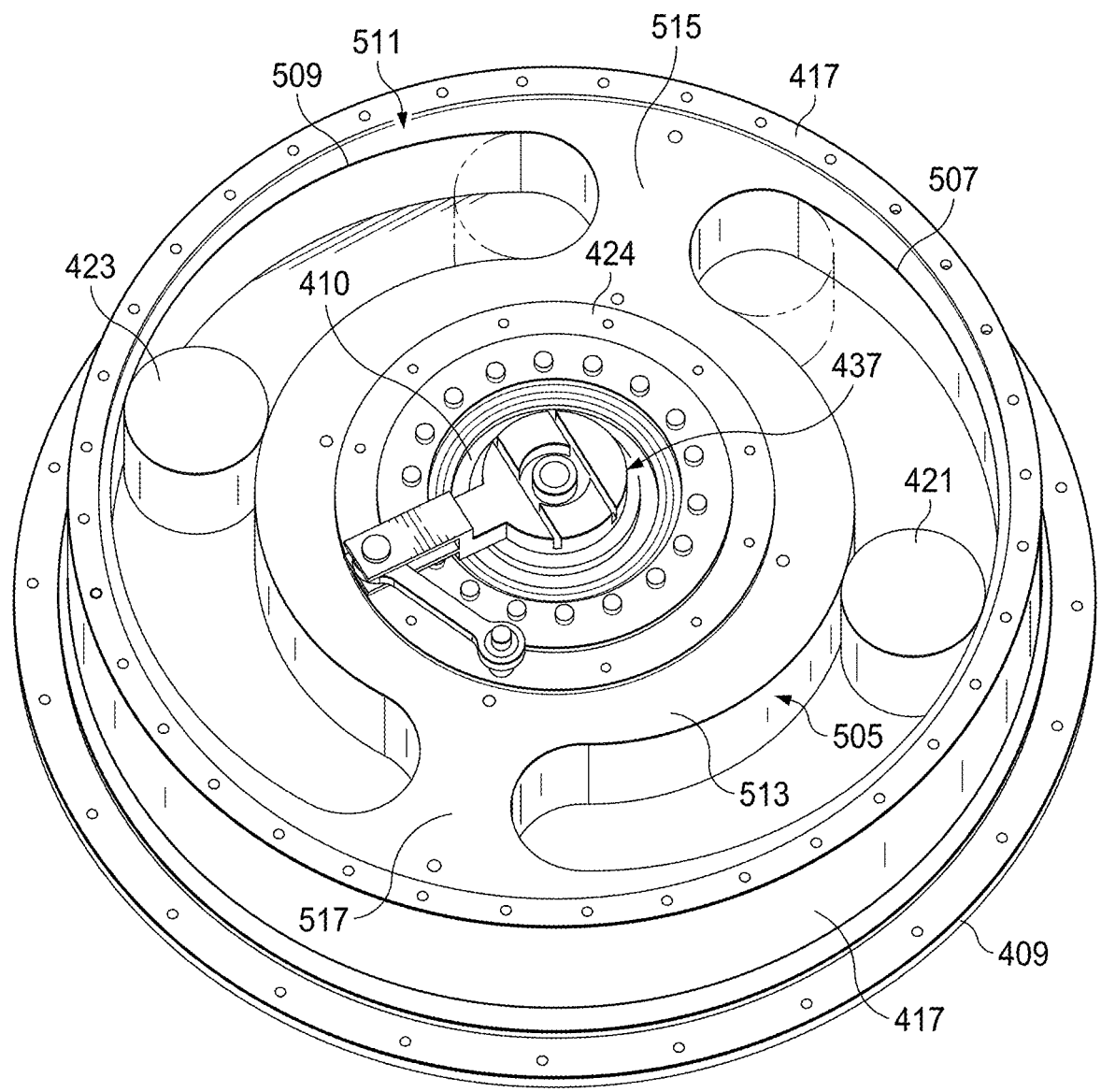
FIG. 17 is an oblique view of the attenuator of FIG. 15 with components removed.
Figure 18:
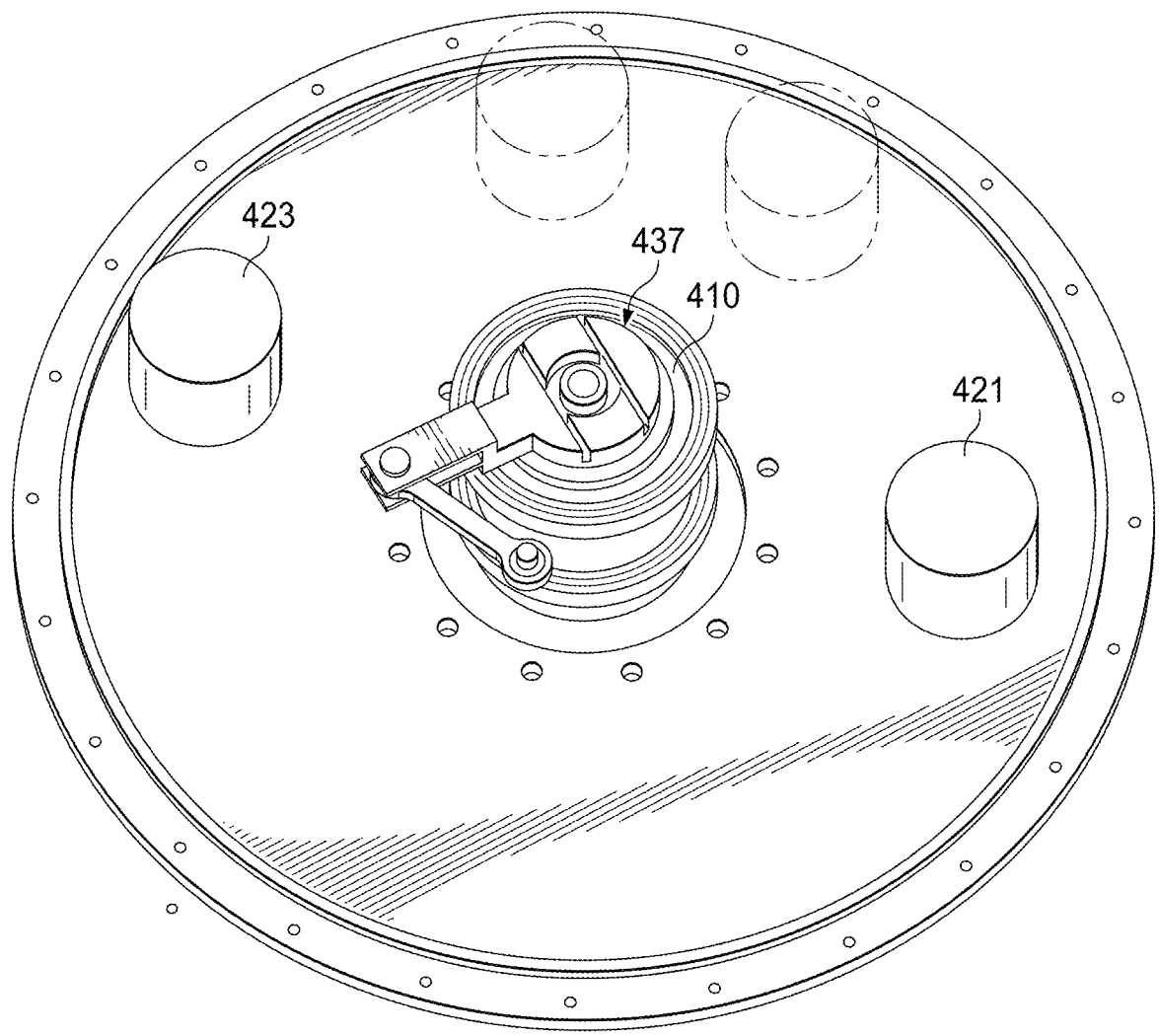
FIG. 18 is an oblique view of the attenuator of FIG. 15 with components removed.
Figure 19:
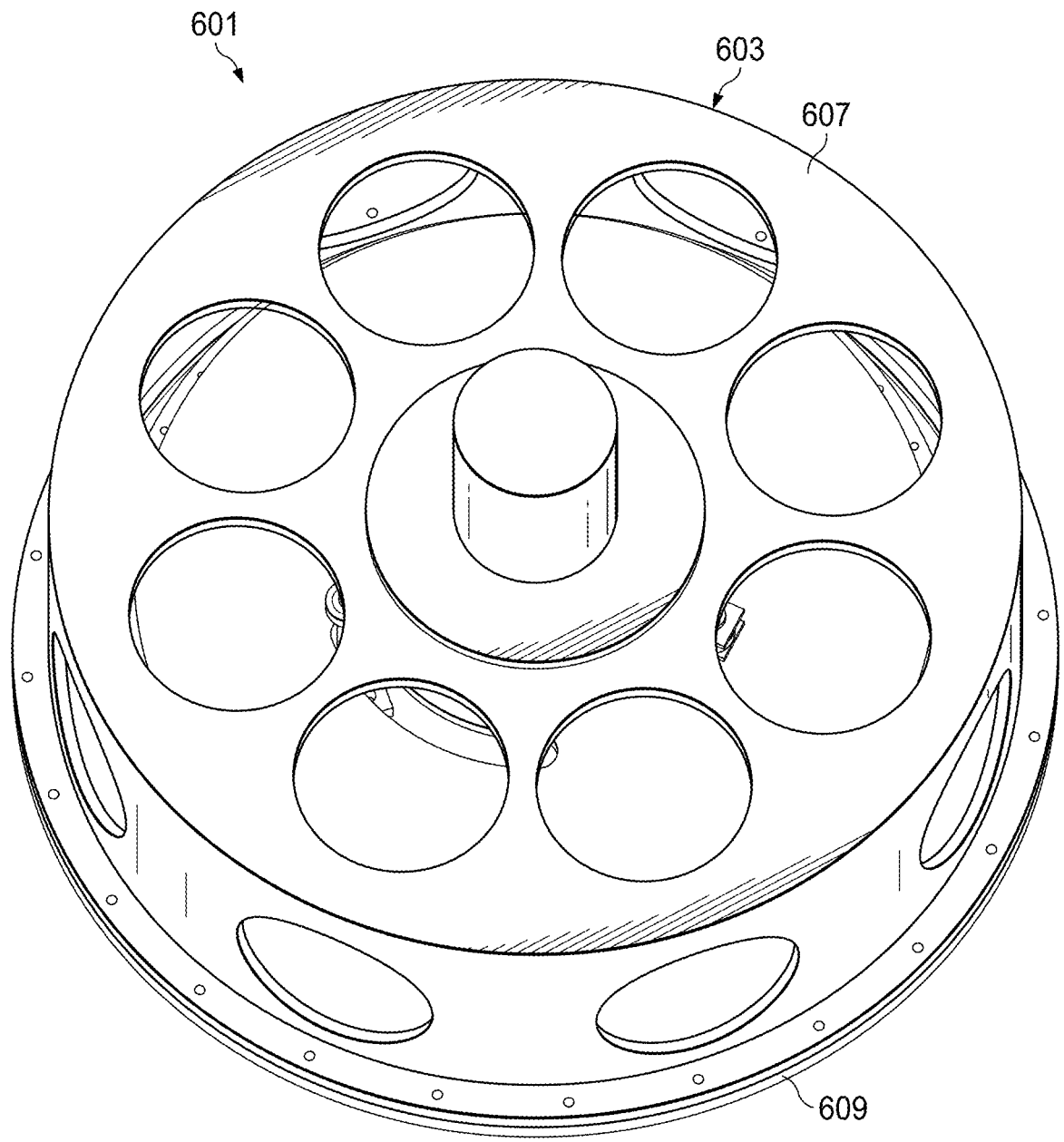
FIG. 19 is an oblique view of another embodiment of an attenuator according to this disclosure.
Figure 20:
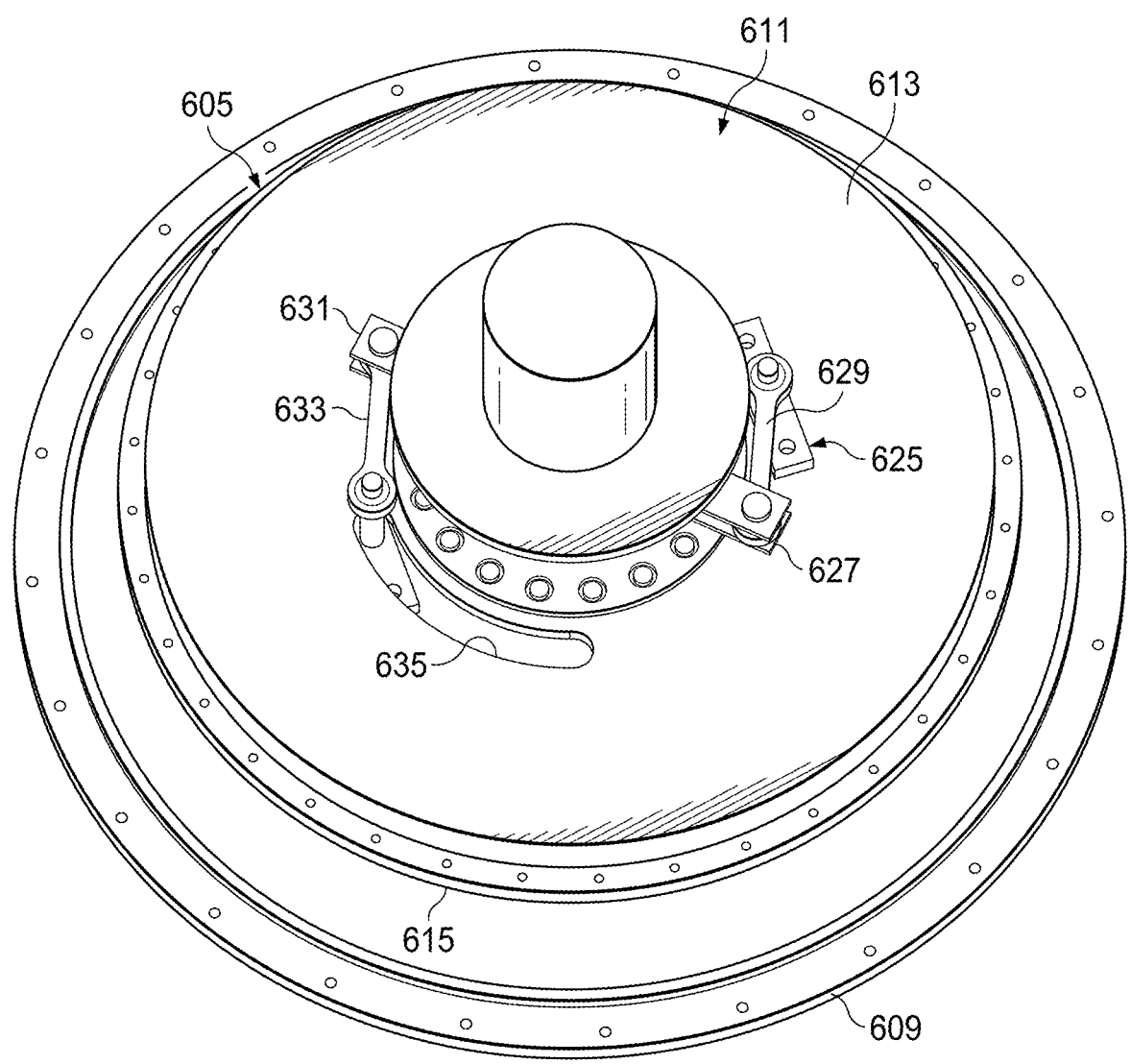
FIG. 20 is an oblique view of the attenuator of FIG. 19 with components removed.
Figure 21:
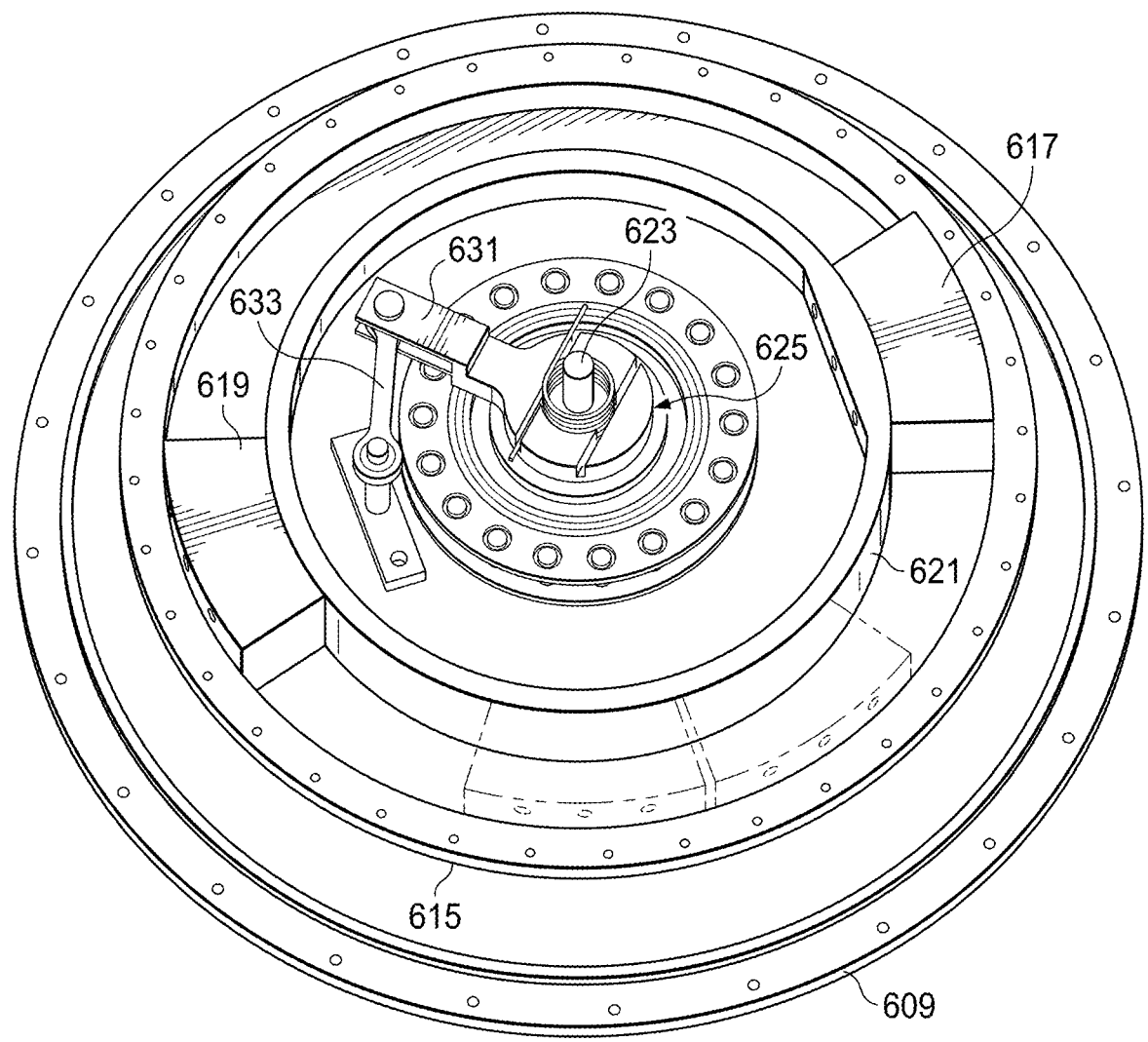
FIG. 21 is an oblique view of the attenuator of FIG. 19 with components removed.
Figure 22:
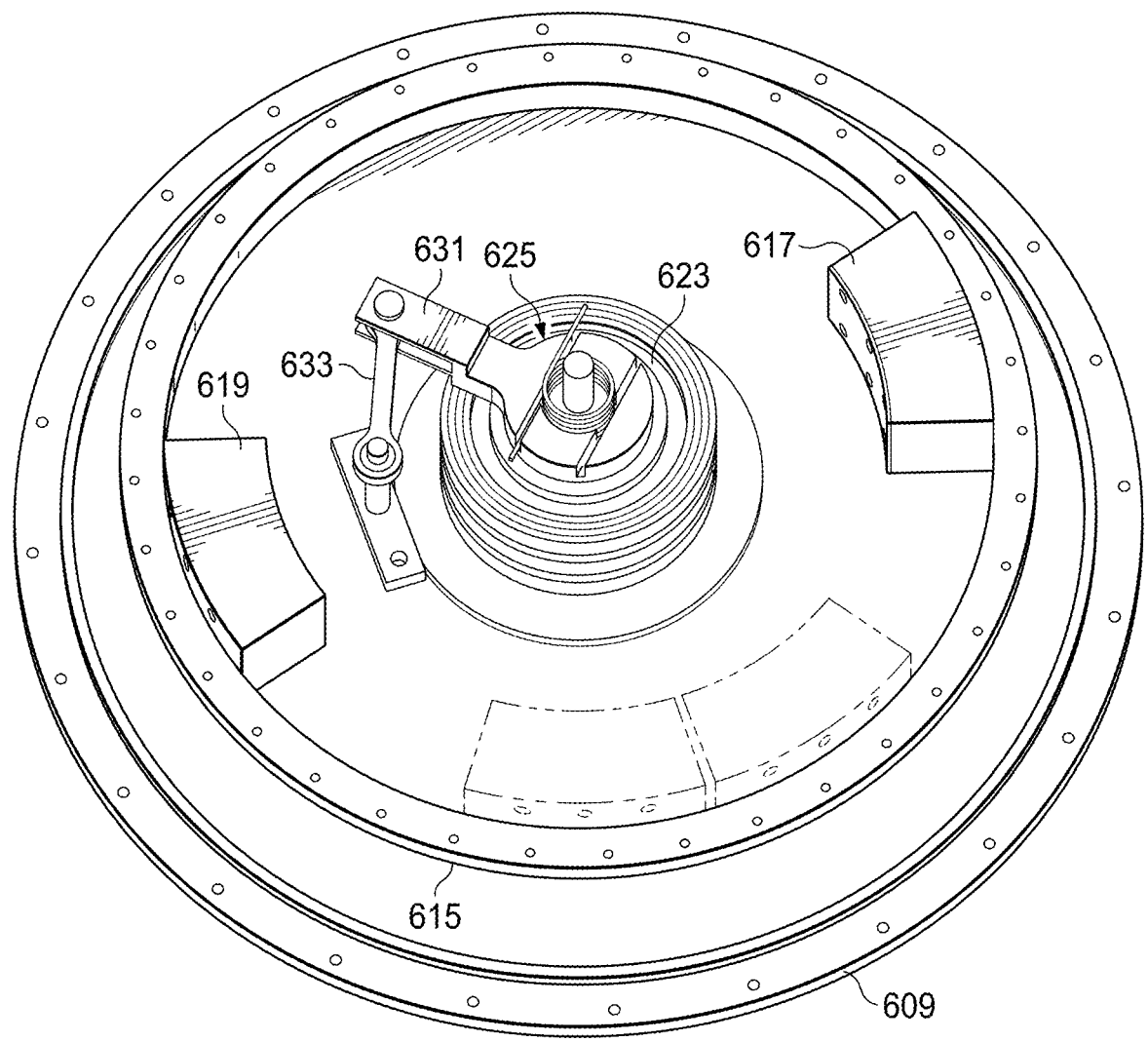
FIG. 22 is an oblique view of the attenuator of FIG. 19 with components removed.
Figure 23:
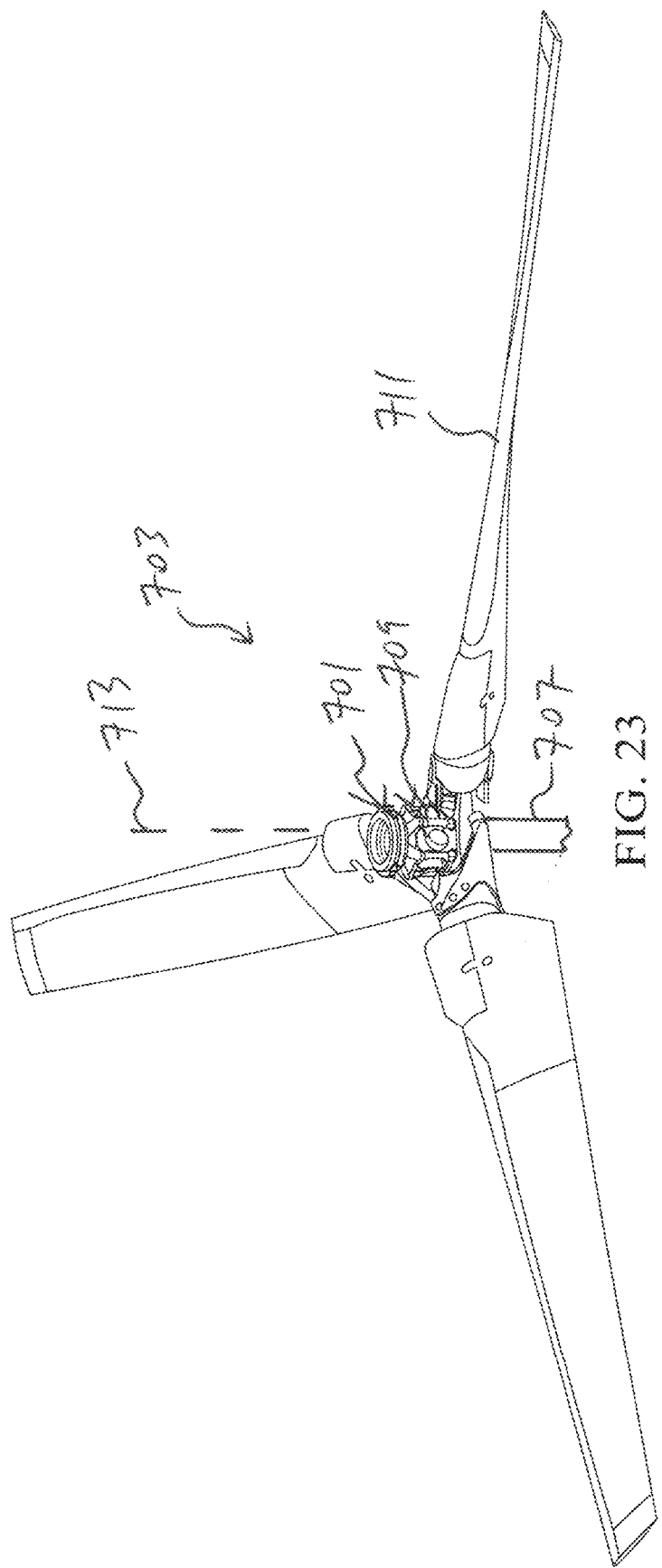
FIG. 23 is an oblique view of a proprotor assembly with a vibration attenuator according to this disclosure installed thereon.
Figure 24:
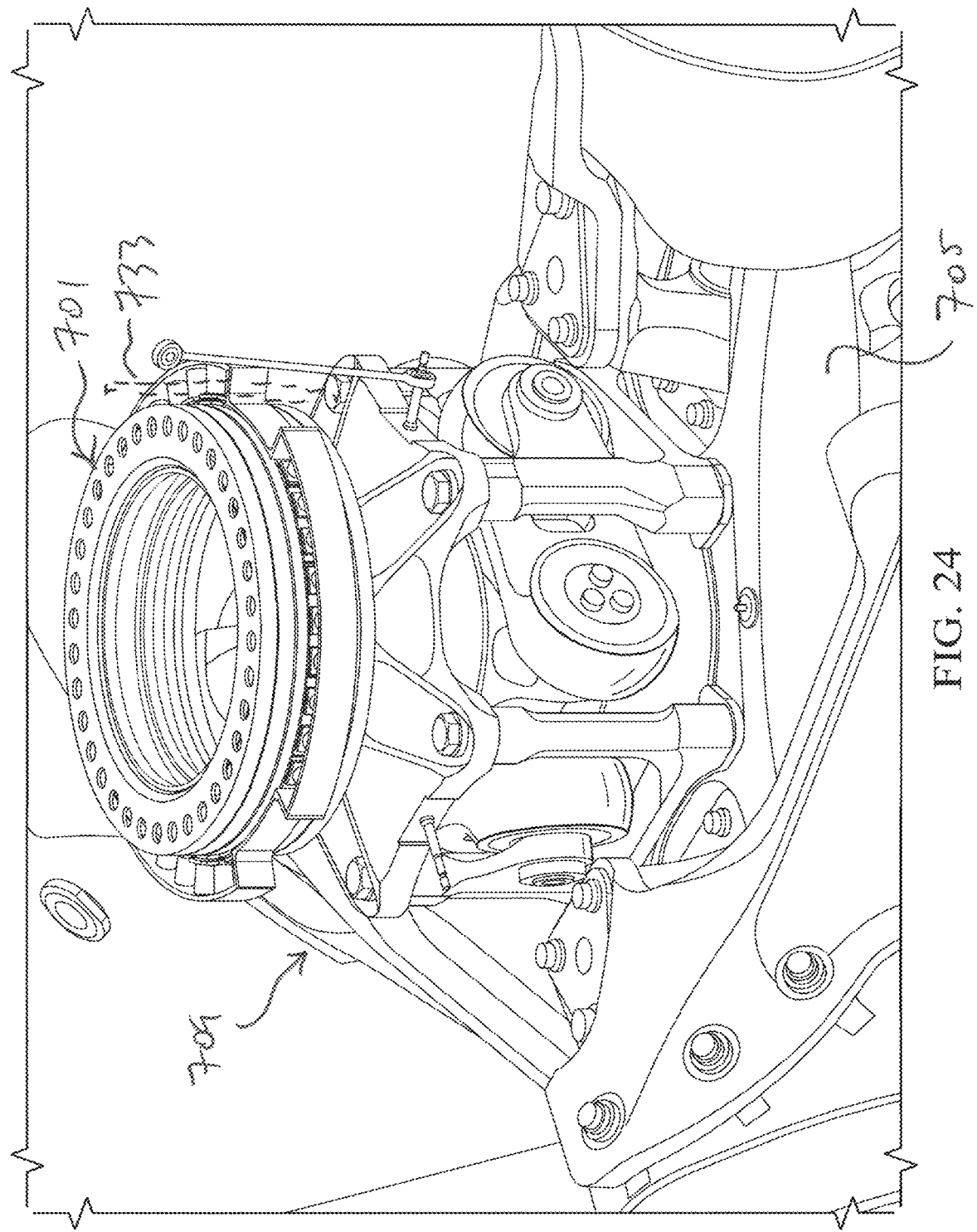
FIG. 24 is an enlarged view of a portion of the proprotor assembly of FIG. 23.
Figure 25:
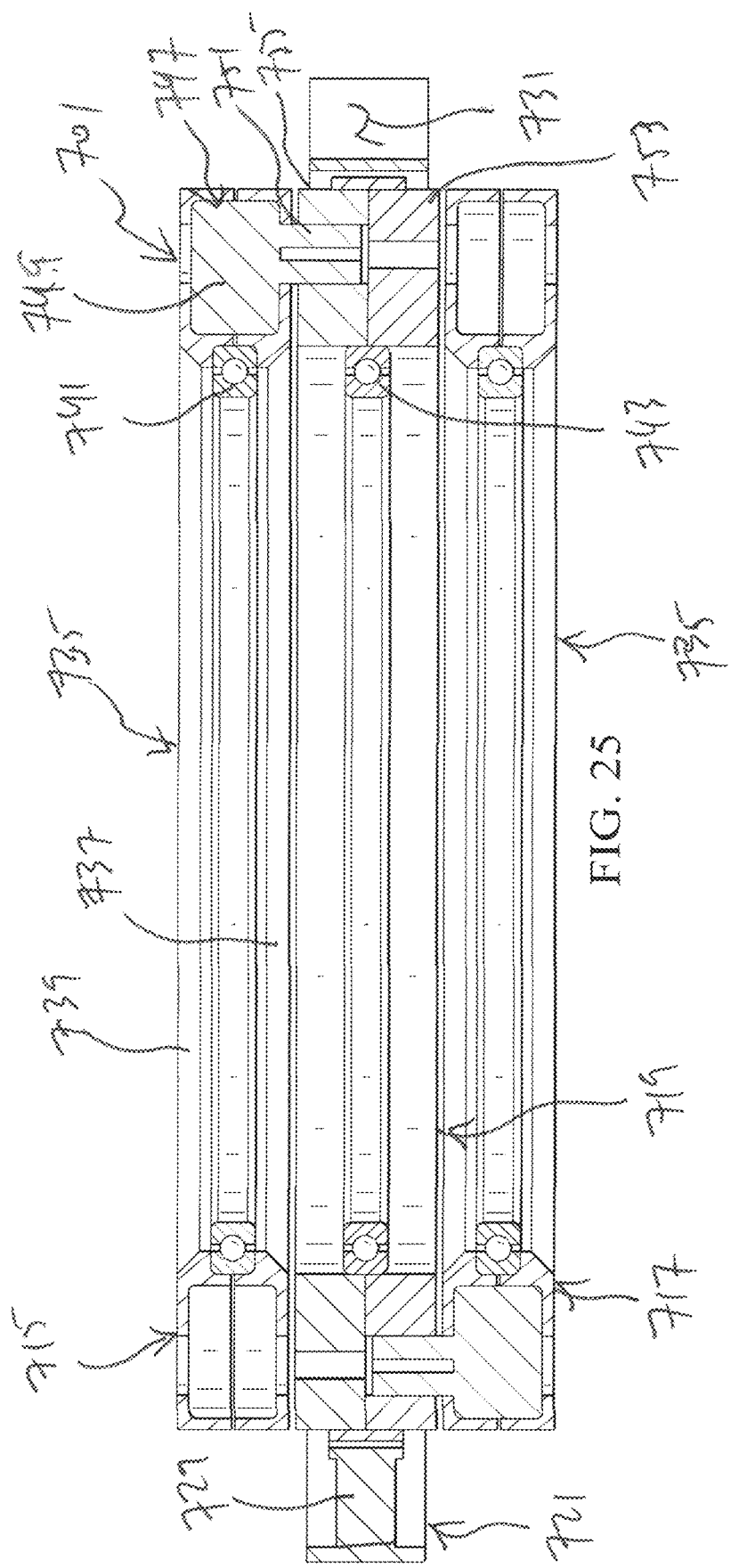
FIG. 25 is a cross-section view of a portion of the attenuator of FIG. 23.
Figure 26:
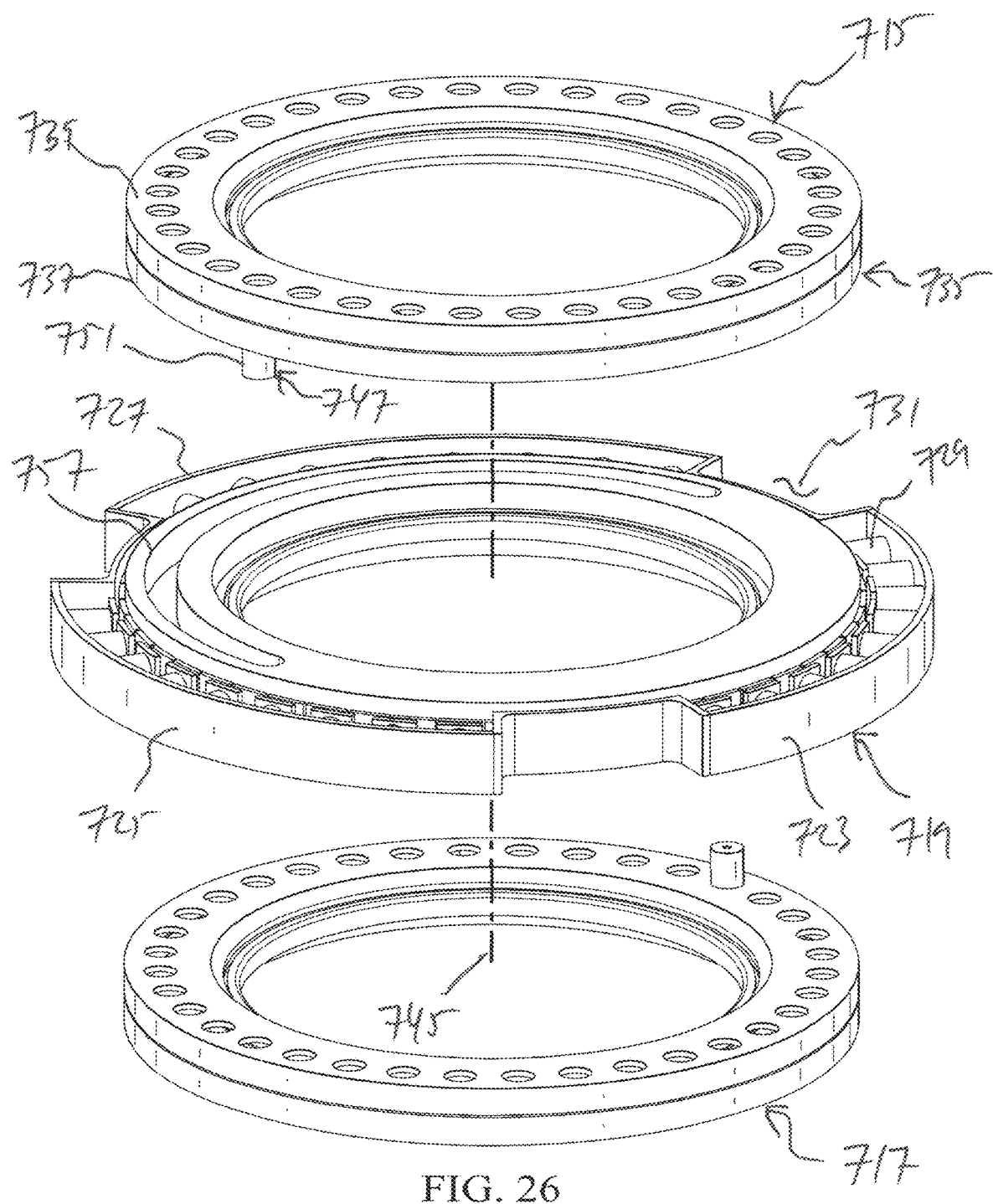
FIG. 26 is an oblique exploded view of the attenuator of FIG. 23.

FIGS. 9 and 10 illustrate a vibration attenuator 301 according to this disclosure. An outer cover 303 comprises upper plate 305 and lower plate 307, and apertures 309 allow for rods 131 to extend therethrough from below lower plate 307. When assembled, plates 305, 307 are fastened together and coupled to yoke 119 or mast 121 for rotation together therewith at an angular velocity of 1/rev relative to the aircraft. Within cover 303, a rotating weight system 311 is capable of rotation at a different angular velocity than that of cover 303, and the preferred velocity of system 311 is 3/rev.

Weight system 311 is constructed and operated similarly to weight system 141 of attenuator 117. An inner plate 313 is rotatable relative to lower plate 307 via ball bearings 315 (some shown) on bearing track 317 around the periphery of plate 313. Outer ring 319 is mounted to plate 307 for rotation therewith and provides a circumferential reaction surface for reacting the centrifugal force of rolling weight assemblies 321, 323. Inner ring 325 is also mounted to plate 313 and comprises a ring portion 327 and two stops 329, 331. Ring portion 327 and outer ring 319 cooperate to define a track for movement of weight assemblies 321, 323 within the track.

An "interrupted" motor 333 comprises three motor portions 335, 337, 339, each portion 335, 337, 339 comprising multiple coils 341 for producing a force to drive inner plate 313 and weight system 311 in rotation relative to cover 303. Portions 335, 337, 339 may be operated independently or as one array with gaps between portions 335, 337, 339. In this manner, motor 333 provides gaps in the array of coils 341 to allow for apertures 309 to be located as shown. Oil may optionally be located in the volume within cover 303, and dampers or springs may optionally be installed to help tune the motions of weight assemblies 321, 323.

FIGS. 11 through 22 illustrate additional embodiments of vibration attenuators according to this disclosure.

FIGS. 11 through 14 illustrate vibration attenuator 401, comprising housing 403 and weight system 405. Housing 403 has cage 407 and plate 409, and these are rotated together at the same RPM as the rotor relative to aircraft (1/rev). Weight system 405 is rotatably carried within housing 403 and is rotated by motor 410 at a higher angular velocity relative to the aircraft (n/rev) for attenuating vibrations at a selected frequency.

Weight system 405 comprises a cover 411, having an outer plate 413, an inner plate 415, and a cylindrical housing 417. A constant-thickness outer ring 419 is located within housing 417 along the outer wall of housing 417 and provides a constant-radius reaction surface for reacting the centrifugal force created by a pair of coplanar weights 421, 423. A phasing ring 424 is rotatably carried in an inner portion of housing 417. An inner ring 425 comprises a ring portion 427 and stops 429, 431 located 180 degrees from each other to form a stop assembly, and inner ring 425 is coupled to phasing ring 424 for rotation together with inner plate 415 relative to cover 411 and outer ring 419. Outer ring 419 and ring portion 427 cooperate to define a coaxial constant-radius track divided into two sections 433, 435, one for each weight 421, 423, and weights 421, 423 are free to move within sections 433, 435 between stops 429, 431 as they passively react to forces encountered during operation of the rotor. To damp the motions of weights 421, 423, oil may be located within sections 433, 435. A phasing system 437 comprises a motor-driven arm 439 and a link 444 coupled to phasing ring 424 for selectively controlling the relative position of inner ring 425 as inner ring 425 and cover 411 are rotated by motor 410 at the same angular velocity.

During operation, motor 410 accelerates cover 411 to a selected angular velocity n/rev, such as, for example, 3/rev. At startup, weights 421, 423 are accelerated from rest through contact with stops 429, 431, positioning weights 421, 423 at 180 degrees from each other. This corresponds to a minimum-force configuration, wherein weights 421, 423 are balanced about their axis of rotation. As shear forces are encountered during operation of the rotor, weights 421, 423 move within track sections 433, 435 to create a whirling shear force that opposes the shear forces caused by the rotor. When weights 421, 423 are both adjacent one of stops 429, 431, as shown in the figures, this corresponds to the maximum-force configuration. If motor 410 is stopped for any reason, such as a power failure or commanded shutdown, the angular velocity of weight system 405 decreases to 1/rev. Each of weights 421, 423 is then contacted by one of stops 429, 431, positioning them again as 180 degrees apart (but on the opposite sides of stops 429, 431 as during startup), thereby being balanced again about the axis of rotation. Depending on the selected order of operations, the same balance process preferably occurs as the rotor decreases angular velocity during shutdown.

FIGS. 15 through 18 illustrate vibration attenuator 501, which is constructed and operated similarly to attenuator 401, as described above. However, instead of having constant-radius track sections for coplanar weights 421, 423, weight system 503 comprises a track ring 505 forming elliptical track sections 507, 509.

Track ring 505 comprises a varying-thickness outer ring 511 located within housing 417 along the outer wall of housing 417 and provides a varying-radius reaction surface for reacting the centrifugal force created by weights 421, 423. A varying thickness inner ring 513 is coupled to outer ring 511 with stops 515, 517 located 180 degrees from each other to form a stop assembly, and inner ring 513 is coupled to phasing ring 424. Outer ring 511 and inner ring 513 cooperate to define two track sections 507, 509, one for each weight 421, 423, and weights 421, 423 are free to move within sections 507, 509 between stops 515, 517 as they passively react to forces encountered during operation of the rotor. To damp the motions of weights 421, 423, oil may be located within track sections 507, 509. Inner ring 513 is coupled to phasing ring 424, allowing phasing system 437 to selectively control the relative position of track ring 505 as track ring 505 and cover 411 are rotated by motor 410 at the same angular velocity. Though shown with a varying radius, track sections 507, 509 may alternatively be formed as constant-radius sections that are offset within attenuator 501.

As with attenuator 401, weights 421, 423 are accelerated from rest at startup through contact with stops 515, 517, positioning weights 421, 423 at 180 degrees from each other. However, as centrifugal force on weights 421, 423 increases, the elliptical shape of track sections 507, 509 causes weights 421, 423 to shift from positions 180 degrees apart adjacent opposing stops 515, 517, where the radius of sections 507, 509 is at the minimum, to the opposing positions shown in the figures, where the radius of sections 507, 509 is at the maximum. In this manner, the centrifugal force acts as a spring, urging weights 421, 423 to positions corresponding to a minimum-force configuration, wherein weights 421, 423 are balanced about their axis of rotation. As shear forces are encountered during operation of the rotor, weights 421, 423 move against the "spring" force within sections 507, 509 to create a whirling shear force that opposes the shear forces caused by the rotor. When weights 421, 423 are both adjacent one of stops 429, 431, as shown in phantom in FIG. 18, this corresponds to the maximum-force configuration.

FIGS. 19 through 22 illustrate vibration attenuator 601, comprising a cover 603, which rotates at 1/rev with the rotor, and a weight system 605, which is rotatably carried within cover 603 and rotates at a selected angular velocity n/rev, such as, for example, 3/rev. Cover 603 has cage 607 and plate 609, and weight system 605 has a housing 611 comprising upper plate 613 and lower plate 615.

Two coplanar weights 617, 619 are located within housing 611, with weight 617 being coupled to and rotating with housing 611 and weight 619 coupled to and rotating with bearing ring 621. Bearing ring 621 and housing 611 are driven in rotation together at the selected n/rev angular velocity by motor 623, but ring 621 and housing 611 are also carried on separate bearings to allow for selective relative rotation therebetween controlled by a phasing system 625. An arm 627 is coupled by link 629 to upper plate 613, and an arm 631 is coupled by link 633 and through slot 635 to ring 621, motors (not shown) being configured for selectively driving arms 627, 631 in rotation relative to each other for positioning weights 617, 619 relative to each other about the axis of rotation.

During operation, cover 603 rotates together with the rotor at 1/rev, and weight system 605 is rotated by motor 623 at a selected n/rev. At startup, weights 617, 619 are preferably oriented as 180 degrees from each other, as shown in the figures, and this corresponds to a minimum-force configuration. Weights 617, 619 may be angularly positioned relative to each other by rotation of arms 627, 631 relative to each other between a position with weights 617, 619 180 degrees apart, as shown in the figures and corresponding to a minimum-force configuration, and a position with weights adjacent each other, shown in phantom and corresponding to a maximum-force configuration.

FIGS. 23 through 26 illustrate a vibration attenuator 701 configured for use on proprotor 703, which is constructed similarly to proprotor 109 of FIG. 1. Proprotor 703 comprises a yoke 705 coupled to mast 707 by a constant-velocity gimbal system 709, allowing yoke 705 to gimbal relative to mast 707. Blades 711 are pivotally coupled to yoke 705 for rotation with yoke 705 and mast 707 about a mast axis 713 while allowing for pivoting of the blades about a pitch axis.

Figure 27:
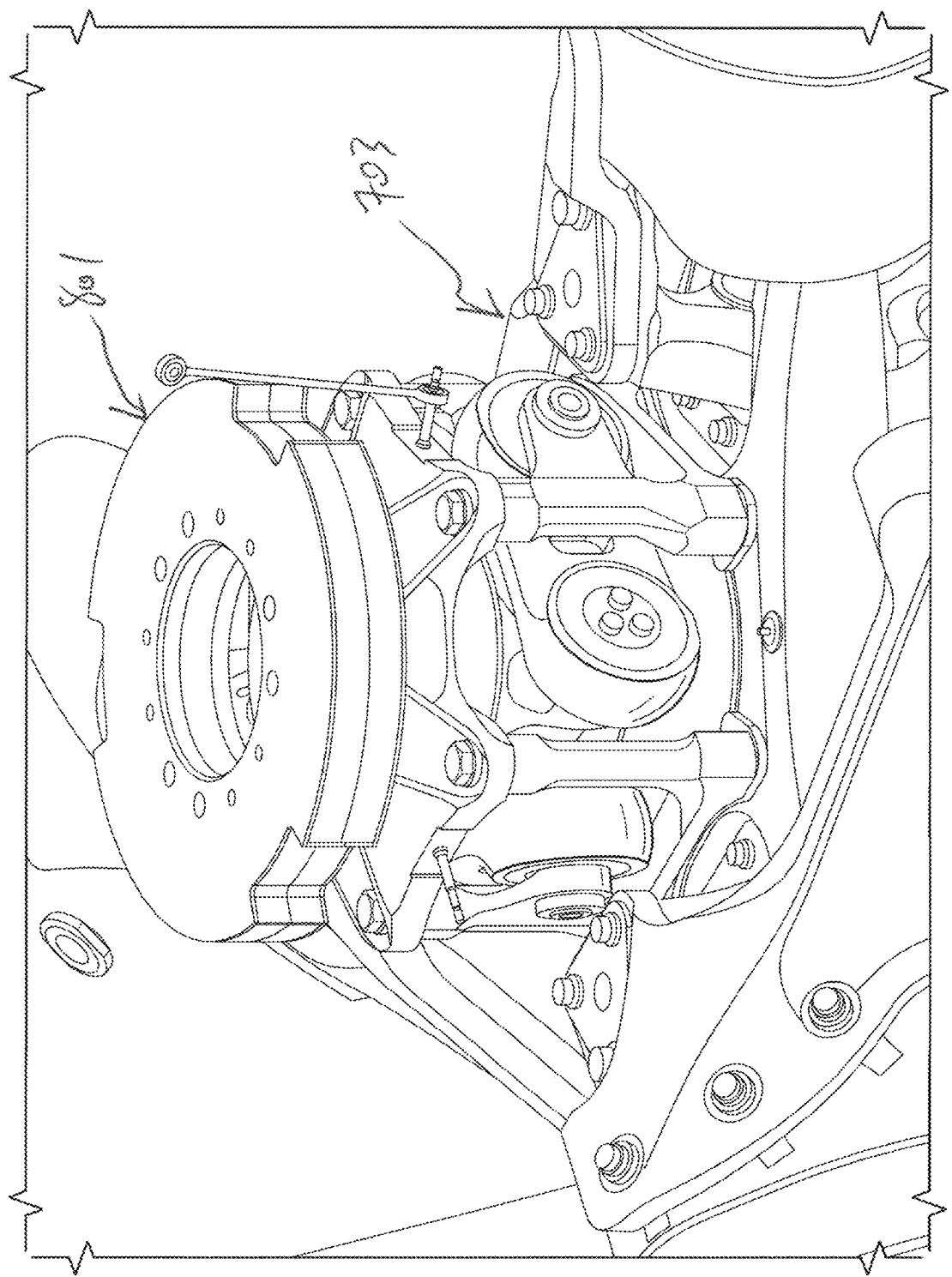
FIG. 27 is an oblique view of a proprotor assembly with a vibration attenuator according to this disclosure installed thereon.
Figure 28:
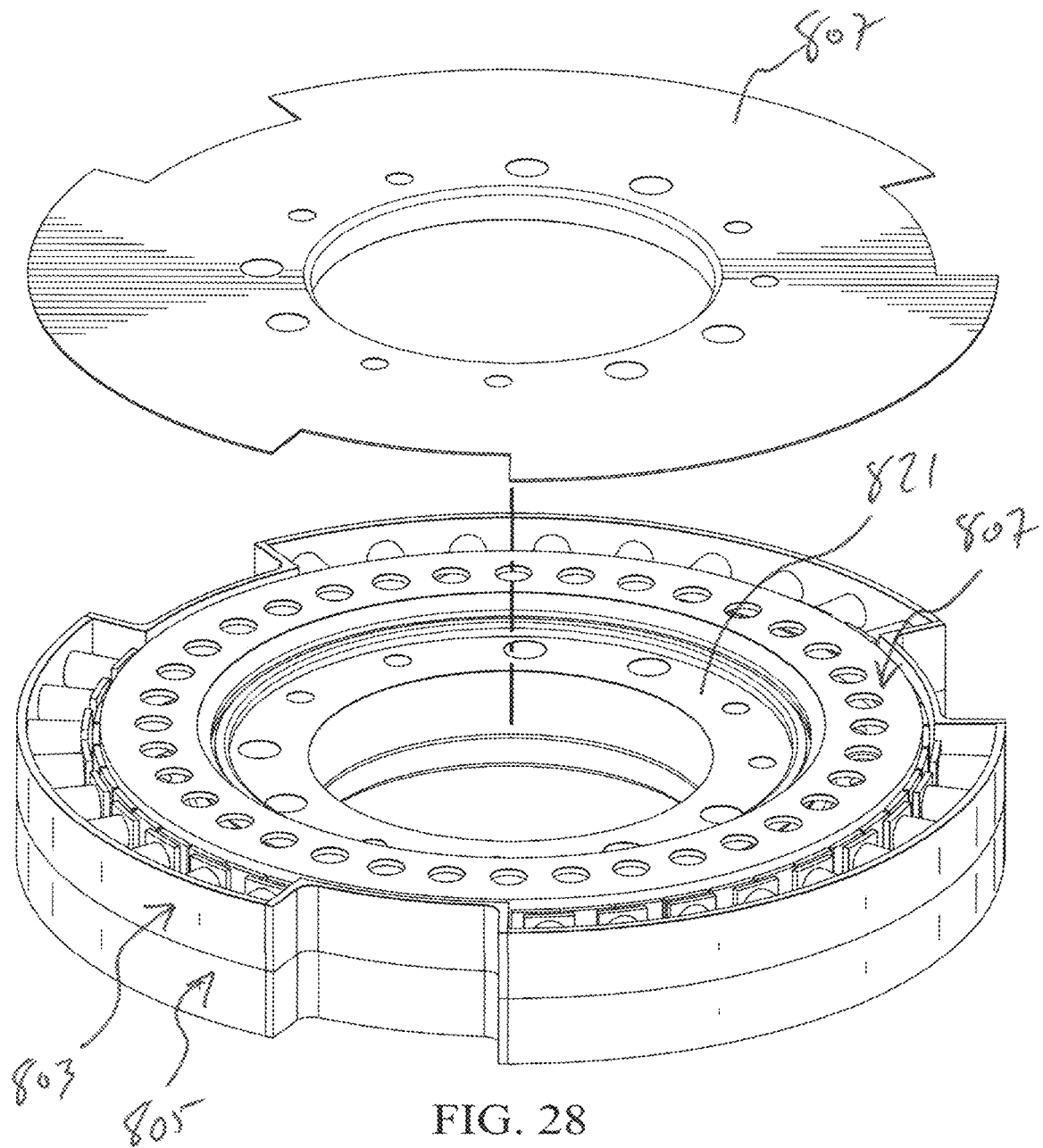
FIG. 28 is an oblique view of the attenuator of FIG. 27 with a cover removed.
Figure 29:
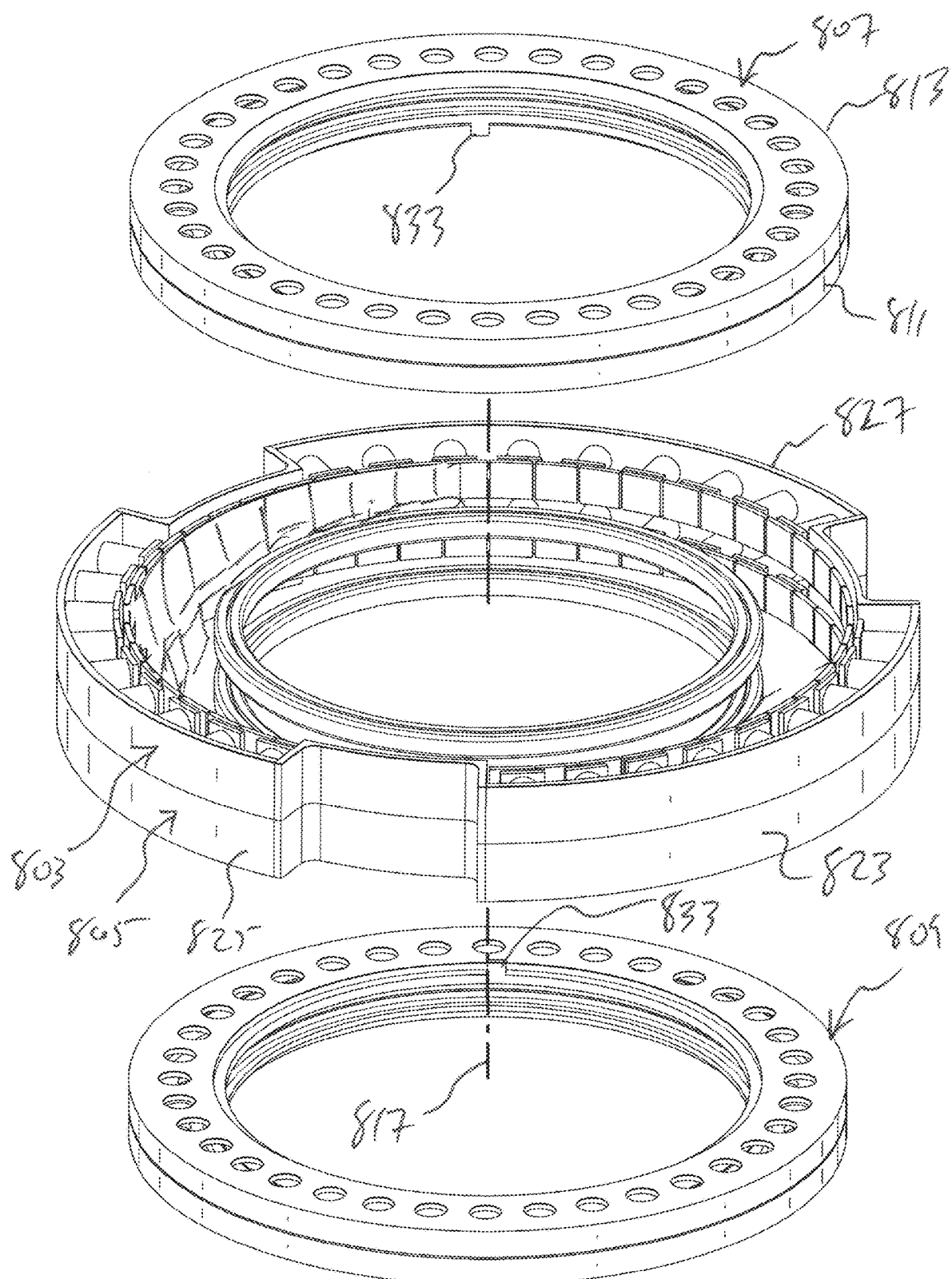
FIG. 29 is an oblique exploded of the attenuator of FIG. 27.

As with attenuators described above, attenuator 701 comprises rotating assemblies enclosed within a housing, the cover of which is shown removed to make interior components visible. The cover cooperates with a motor assembly to forma housing, and this is similar to the housing shown in FIG. 27. An outboard weight ring 715, an inboard weight ring 717, and a central ring 719 located between rings 715, 717 are capable of relative coaxial rotation. Like motor 333, a circumferential "interrupted" motor 721 is coplanar with central ring 719 and comprises three motor portions 723, 725, 727 arrayed about the exterior of attenuator 701, motor 721 being carried by the cover. Each portion 723, 725, 727 comprises multiple coils 729 for producing a force to drive central ring 719 in rotation relative to motor 721 and yoke 705 at a selected RPM. Portions 723, 725, 727 may be operated independently or as one array with gaps 731 between portions 723, 725, 727. In this manner, each gap 731 in the array of coils 729 allows for a component, such as rods 733 (one shown in phantom) used for measurement of the gimbal angle, to extend therethrough.

Outboard weight ring 715 and inboard weight ring 717 are preferably constructed identically. Each ring 715, 717 comprises a toroidal frame assembly 735 formed from an inner frame 737 and an outer frame 739. A circumferential ball bearing 741 is located on an inner portion of each frame assembly 735, and a circumferential ball bearing 743 is located on an inner portion of motor ring 719, bearings 741, 743 allowing for rotation of weight rings 715, 717 and motor ring 719 about their shared axis 745 relative to each other and to motor 719. Bearings 741, 743 are carried by the housing or by a central component, such as a mast or standpipe. Each ring 715, 717 carries a weight 747 comprising a frame portion 749 carried within frame assembly 735 and a post 751 extending outward from frame assembly 735 toward central ring 719.

Central ring 719 is configured to be driven in rotation by motor 721 and is formed from inboard frame 753 and outboard frame 755. Each frame 747, 749 comprises a constant-radius, 180-degree groove 757 formed to receive post 751 of the associated weight ring 715, 717. In this manner, rotation of central ring 719 causes rotation of weight rings 715, 717 as each post 751 contacts an end of the associated groove 757. As for other embodiments described above, this configuration allows for weights 747 to be positioned 180 degrees apart during startup or shutdown of attenuator 701 as the inertia or momentum of weight rings 715, 717 cause posts 751 to be contacted by the ends of grooves 757. During operation, weight rings 715, 717 are free to rotate relative to central ring 719 due to shear forces caused by operation of proprotor 703.

FIGS. 27 through 33 illustrate another embodiment of an attenuator according to this disclosure and configured for use on proprotor 703. Attenuator 801 comprises two stacked interrupted motors 803, 805, the outer frames of which cooperate with cover 807 to form a housing. Motors 803, 805 are preferably identical and constructed similarly to motor 721 of attenuator 701, as described above, and are configured to cause rotation of an associated weight ring 807, 809, respectively. Weight rings 807, 809 are preferably identical and formed from an inboard frame 811 and an outboard frame 813. Each weight ring 807, 809 carries a weight 815 for rotation about shared axis 817 together with associated frames 811, 813. Each weight ring 807, 809 is carried on a bearing 819, allowing for rotation relative to the associated motor 903, 805 and to a central ring 821. As with embodiments described above, interrupted motors 803 805 comprise three motor portions 823, 825, 827, and each portion 823, 825, 827 comprises multiple coils 829 configured for producing a force to drive the associated weight ring in rotation relative to motor 721 and to proprotor 703 at a selected n/rev angular velocity. As with attenuators described above, coils 829 can be energized to interact with magnets 831 arrayed about the periphery of each weight ring 807, 809 for inducing a torque on weight rings 807, 809.

Each inboard frame 811 has a stop 833 that extends toward the other inboard frame 811, allowing stops 833 to contact each other and limit relative rotation between weight rings 817, 809 to an amount just below 360 degrees, based on the width of stops 833. Weights 815 are position relative to stops 833 so that when stops 833 are in contact, weights 815 are positioned approximately 180 degrees apart. Stops 833 allow for one motor 803, 805 to spin both rings 807, 809 and for controlled shutdown if one motor 803, 805 fails.

Figure 30:
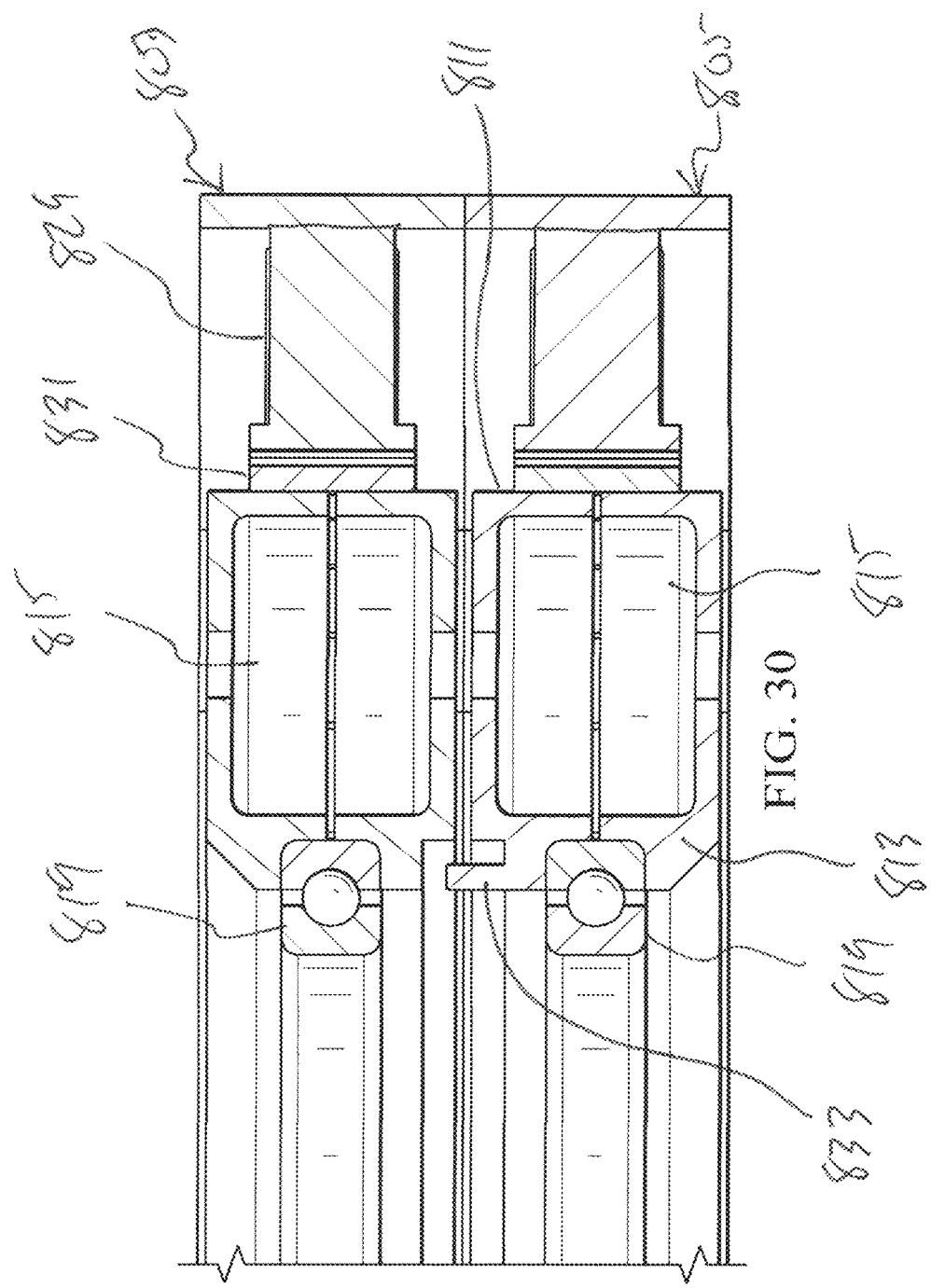
FIG. 30 is a cross-section view of a portion of the attenuator of FIG. 27.
Figure 31:
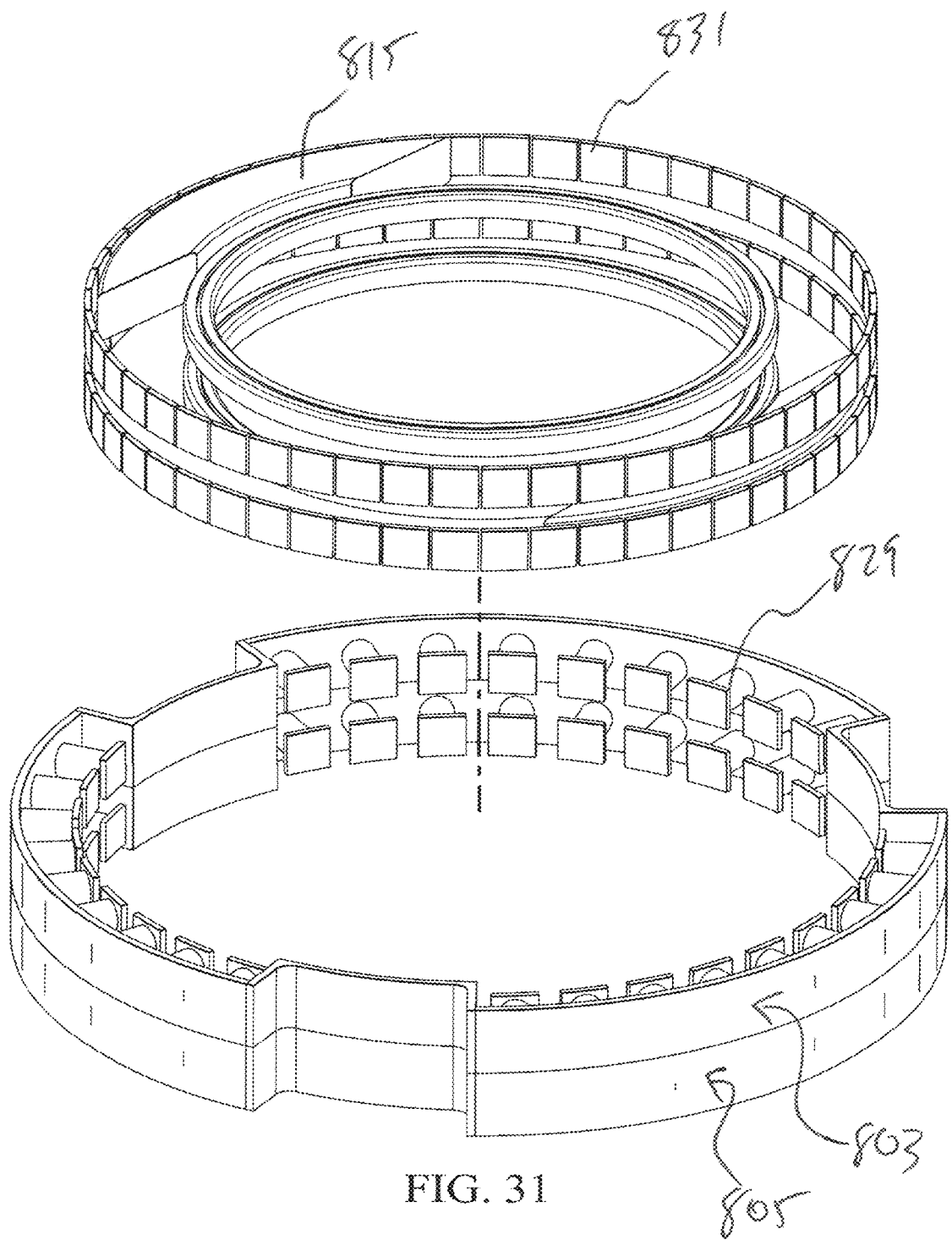
FIG. 31 is an oblique exploded of components of the attenuator of FIG. 27.
Figure 32:
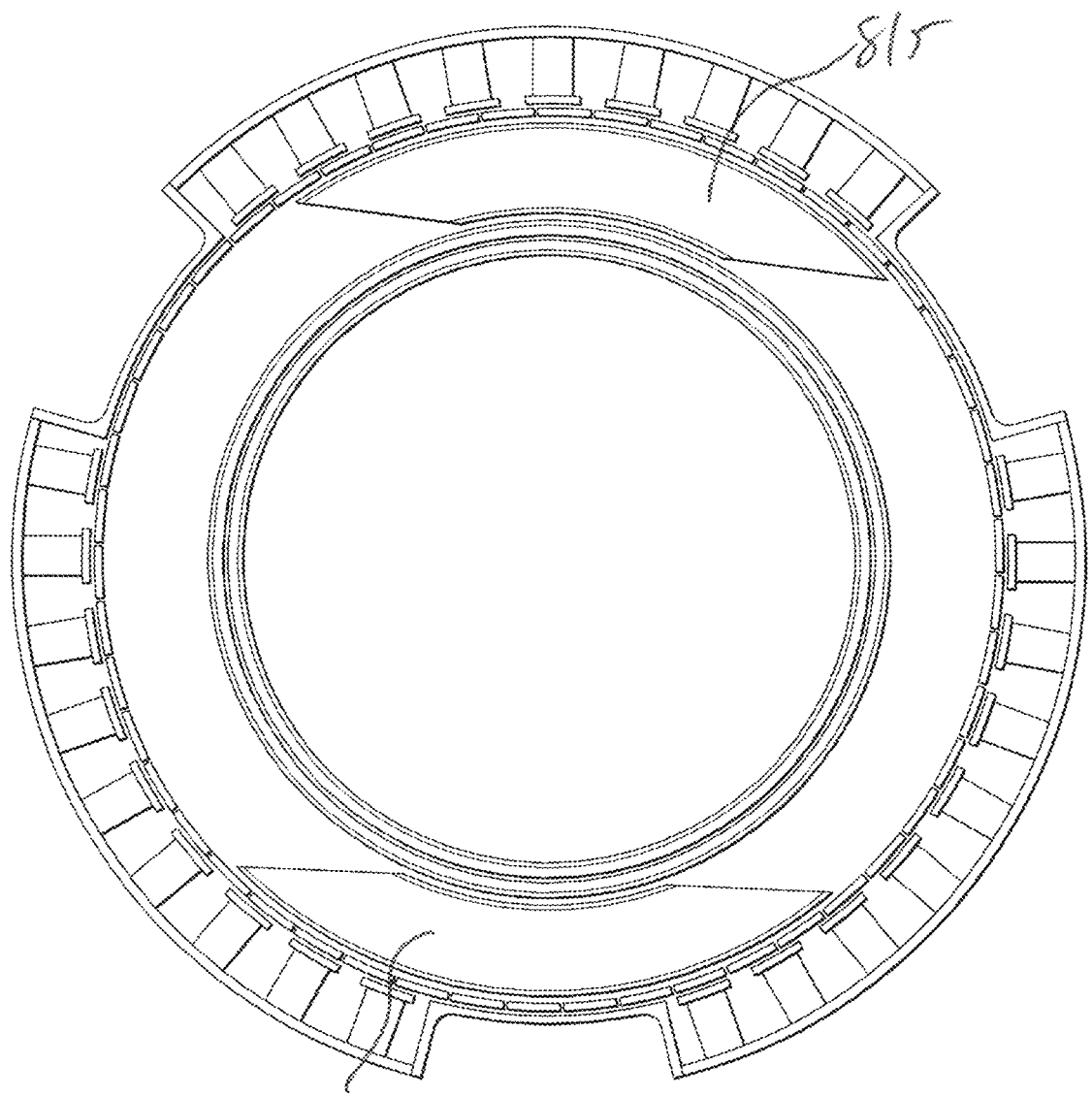
FIG. 32 is a plan view of components of the attenuator of FIG. 27.
Figure 33:
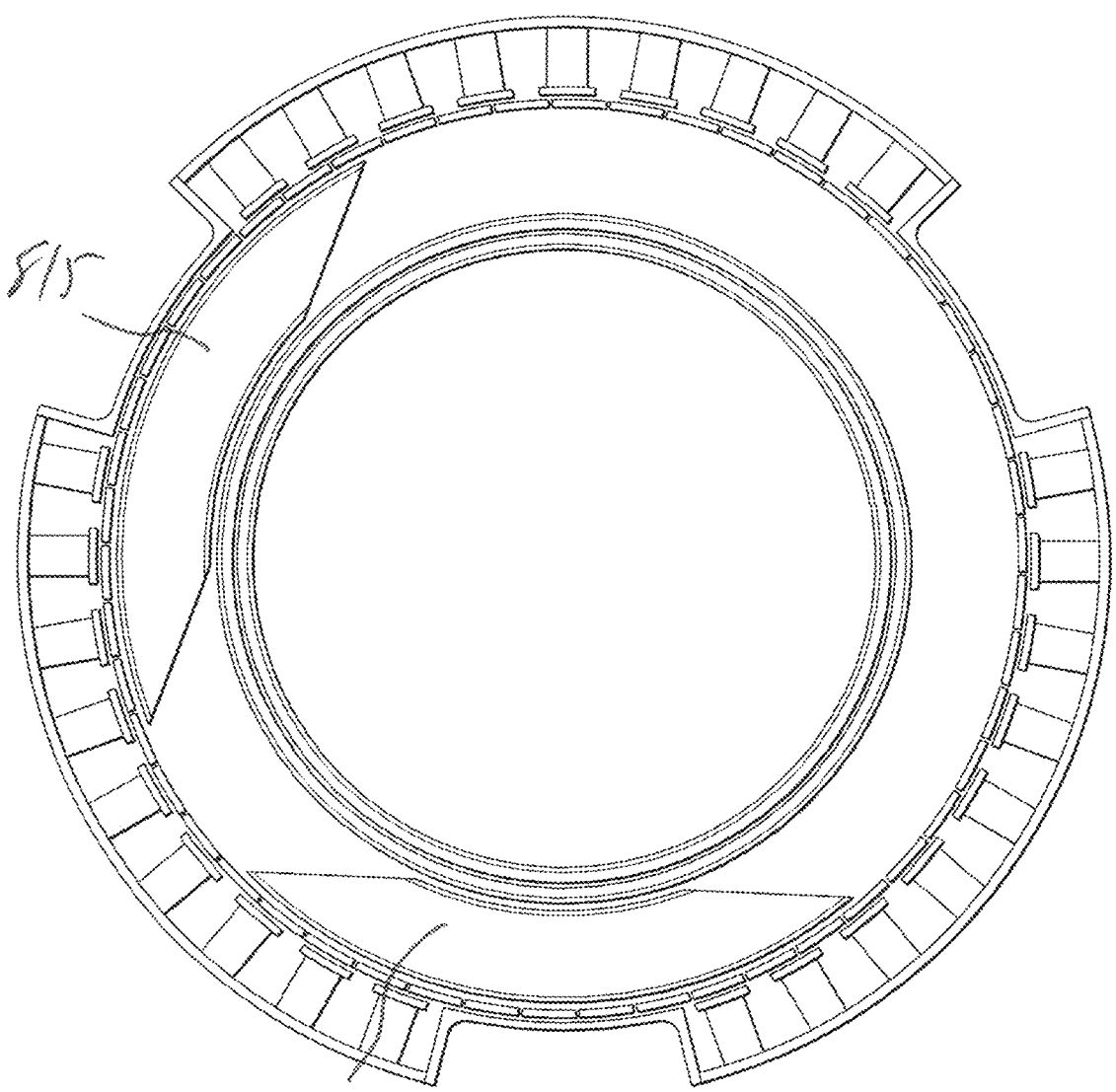
FIG. 33 is a plan view of components of the attenuator of FIG. 27.

During operation, motors 803, 805 cause rotation of weights rings 807, 809 at a selected angular velocity and to position weights 815 relative to each other while rotating. This allows attenuator to produce a whirling shear force having a desired magnitude and phase. As with attenuators described above, a minimum-force configuration positions weights 815 180 degrees apart, as shown in FIG. 31, whereas a maximum-force configuration positions weights 815 in alignment, as shown in FIG. 30. Attenuator 801 is capable of positioning weights 815 in relative positions between the maximum- and minimum-force configurations, as example of which is shown in FIG. 33.

Figure 34:
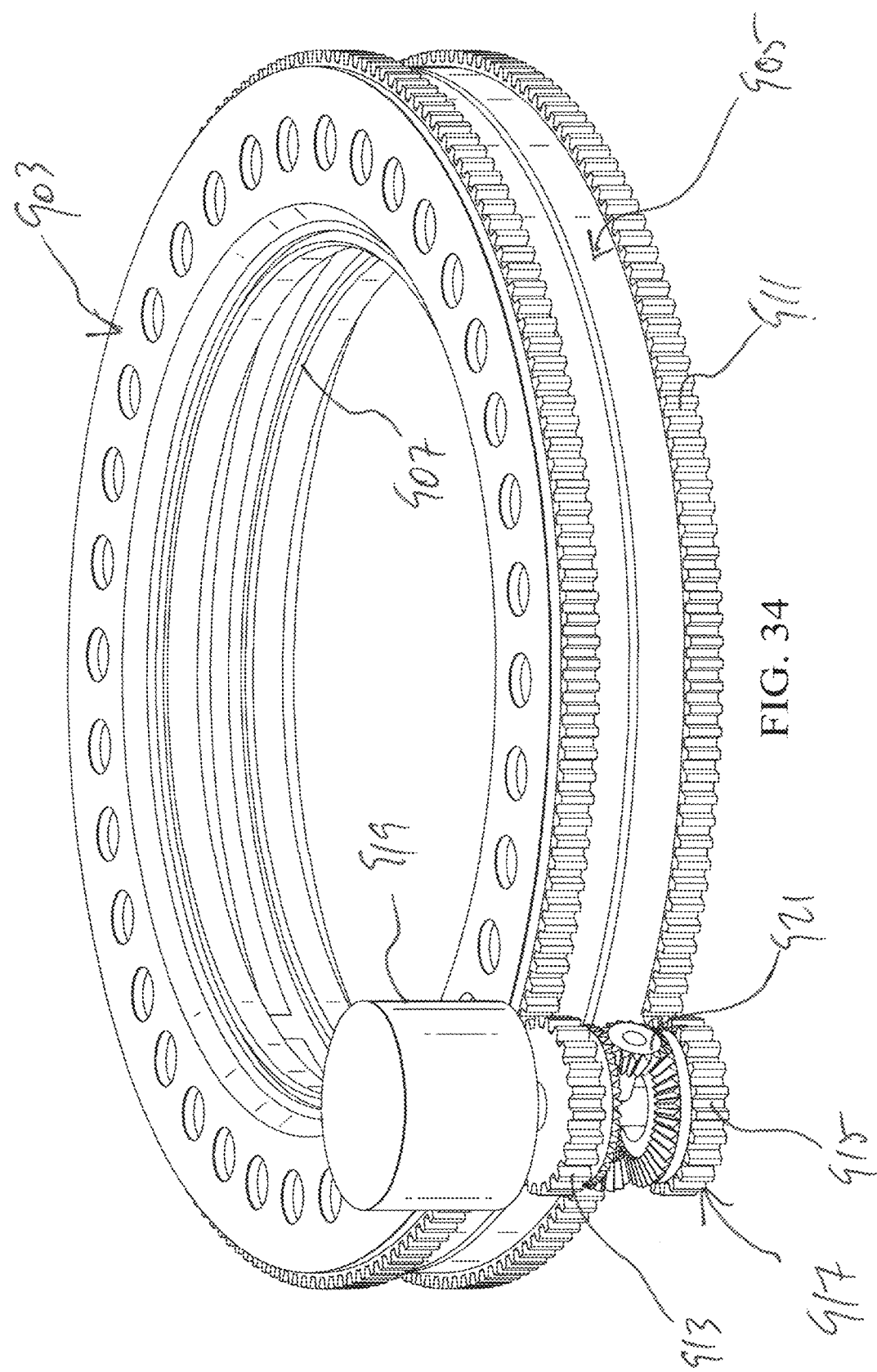
FIG. 34 is an oblique view of a vibration attenuator according to this disclosure.
Figure 35:
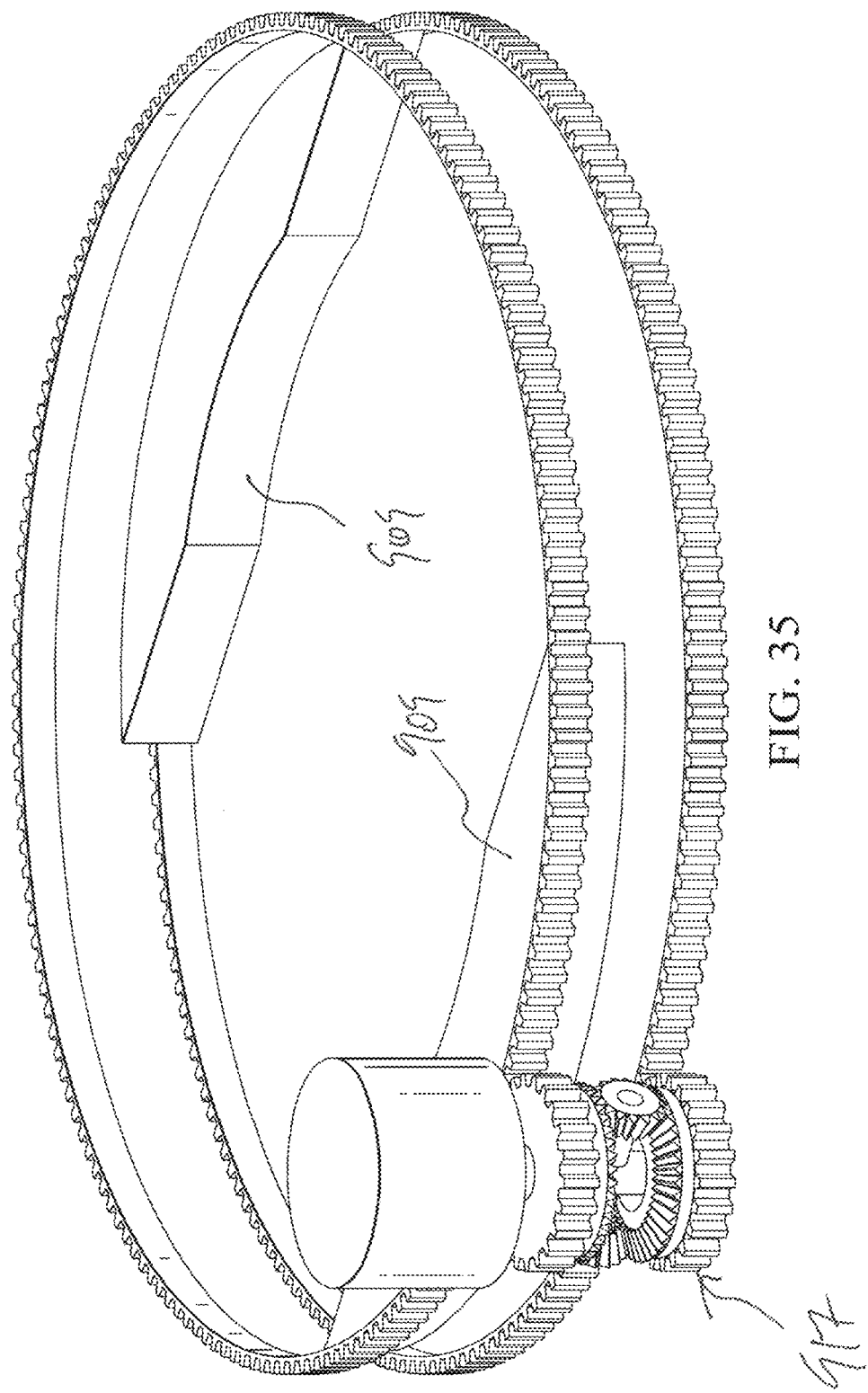
FIG. 35 is an oblique view of portions of the attenuator of FIG. 34.

Another embodiment of an attenuator according to this disclosure is illustrated in FIGS. 34 and 35. Attenuator 901 comprises stacked weight rings 903, 905, which are preferably identical. Weight rings 903, 905 are each carried on a central bearing 907, allowing for relative rotation to each other and to components carrying attenuator 901. Each weight ring carries a weight 909. Though not shown, attenuator 901 may comprise a housing or other structure for enclosing the shown components and/or providing the ability to mount attenuator to a rotor hub, mast, or standpipe.

Attenuator 901 is similar to attenuator 201 of FIG. 8, however each weight ring 903, 905 of attenuator 901 has a circumferential ring gear 911 located on a radially outward surface. A drive assembly 917 comprises a motor 919 configured to drive gears 913, 915 for rotating weight rings 903, 905, each gear 913, 915 engaging an associated ring gear 911. A differential mechanism 921 provides a differential capability to allow for angular movement of weights 909 relative to each other while weight rings 903, 905 are being driven by motor 919. This relative motion can be passive or actively controlled by providing another motor to control the rotational position of gears within differential mechanism 921 or by controlling the relative position of gears 913 915. This configuration allows the single motor 919 to spin weight rings 903, 905 at an average angular velocity and at a determined phase while the relative positions of weights 909 can vary, as needed, between a 0-degree offset, corresponding to a maximum-force configuration, and a 180-degree offset, corresponding to a minimum-force configuration. This provides for the passive adjustment of the force output to balance the forcing vibration. Hard stops can be installed to keep weights 909 from moving past each other to other than the required 0 to 180-degree phasing. Damping of some form, such as, for example, oil between the weights may also be desired. A spring could also be used to keep the weights at 180 degrees apart unless reacting to a forcing function load at n/rev.

While FIGS. 2 through 35 illustrate particular embodiments, all embodiments of the attenuators disclosed herein are preferably sized and configured to allow installation in the same location as attenuator 117, thereby replacing attenuator 117 and, in some embodiments, displacing other components, such as, for example, power distribution ring 129. Also, while the embodiments are shown as being sized and configured for a particular application, embodiments may be sized and configured for use in other applications, such as, for example, on helicopter rotors.

While shown and described as having specific components, it should be noted that the attenuators of this disclosure can incorporate appropriate combinations of components from any of the disclosed embodiments. In addition, while weights 151, 153, 321, 323, 421, 423 are illustrated as particular configurations or shapes, alternative shapes or configurations may be used, such as, for example, spherical weights. Also, in some embodiments, stop assemblies may be free to rotate within a housing, and rotation relative to the housing may be damped for inducing rotation, such as at startup, or slowing rotation, such as at shutdown, of the stop assembly through relative rotation of the housing. While shown and described as being mounted to a hub or mast, the embodiments may also be mounted to a static standpipe. Though shown in an embodiment, outer housings may be optional. Where a pair of weights are shown, one on each side of a stop assembly, it should be understood that there may be more than one weight on each side.

It should also be noted that multiple attenuators may be stacked coaxially to reduce vibrations at other frequencies. Also, springs may be used between the weights of attenuators according to this disclosure. In addition to oil, other forms of damping may be used, such as, for example, friction damping. Attenuators of this disclosure may also include harvesting of any induced power in the system due to the motors functioning as generators where the forcing function causes them to lead the driven phase of the motors, and energy harvesting with local storage may allow the system to self-power with minimal or no input or power from the aircraft. In addition, position sensors for the weights allow software controlling operation of the attenuators to adjust for noncircular forcing functions. Attenuators of this disclosure may also be configured to run passively with no applied spin power once spun up to the forcing function frequency. Also, the attenuators may drive the spinning system thru a spring to allow the weights to adjust their phase without causing reverse EMF in the drive motors. For example, the motors can drive the system with the average spin velocity and let the weights lead and lag in response to the higher harmonic and lower harmonic forces that are often present.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A vibration attenuator for a rotor of an aircraft, the attenuator comprising:
   a track housing adapted for rotation relative to the rotor, the track housing configured for rotation at a second angular velocity greater than a first angular velocity of the rotor;
   a track located within the track housing and having a reaction surface;
   a pair of weights configured for movement within the track and in contact with the reaction surface;
   a stop assembly comprising a pair of stops fixedly spaced 180 degrees from each other, the stops separating the weights from each other, each weight being allowed to travel within the track between the stops; and
   a motor adapted for rotating the track housing relative to the rotor;
   wherein the weights are free to travel relative to each other between a minimum-force configuration, in which the weights are positioned 180 degrees apart, and a maximum-force configuration, in which both weights are adjacent one of the stops.

2. The attenuator of claim 1, wherein the track has a constant radius coaxial with the track housing.

3. The attenuator of claim 1, wherein the track has a varying radius.

4. The attenuator of claim 1, wherein the weights comprise wheels.

5. The attenuator of claim 1, wherein the weights are formed as cylinders.

6. The attenuator of claim 1, wherein the weights are formed as spheres.

7. The attenuator of claim 1, wherein the stop assembly is capable of rotation relative to the track housing.

8. The attenuator of claim 7, further comprising:
   a motor for selectively rotating the stop assembly relative to the track housing.

9. The attenuator of claim 8, further comprising:
   a linkage connecting the motor to the stop assembly.

10. The attenuator of claim 7, wherein the rotation of the stop assembly relative to the track housing is damped for inducing rotation of the stop assembly together with the track housing.

11. The attenuator of claim 1, wherein during startup, inertia of the weights causes the weights to move to the minimum-force configuration, the weights being adjacent opposing stops.

12. The attenuator of claim 1, wherein during shutdown, momentum of the weights causes the weights to move to the minimum-force configuration, the weights being adjacent opposing stops.

13. The attenuator of claim 1, wherein the attenuator is adapted for pivoting together with the rotor during flapping of the rotor.

14. The attenuator of claim 1, further comprising:
   an outer housing enclosing the track housing and adapted for rotation together with the rotor at the first angular velocity, the track housing rotating within and relative to the outer housing.

15. A vibration attenuator for a rotor of an aircraft, the attenuator comprising:
   a track housing adapted for rotation relative to the rotor, the track housing configured for rotation at a second angular velocity greater than a first angular velocity of the rotor;
   a track located within the track housing and having a reaction surface, the track being divided by opposing stops into two opposing sections of equal length;
   a pair of weights, each weight being located within one of the sections and configured for movement within the associated section, the weights being configured to allow movement between the stops and in contact with the reaction surface;
   a motor adapted for rotating the track housing relative to the rotor;
   wherein the weights are free to travel relative to each other between a minimum-force configuration, in which the weights are positioned 180 degrees apart, and a maximum-force configuration, in which both weights are adjacent one of the stops.

16. The attenuator of claim 15, wherein each section has a constant radius coaxial with the track housing.

17. The attenuator of claim 15, wherein each section has a varying radius.

18. The attenuator of claim 15, wherein the weights are formed as cylinders.

19. The attenuator of claim 15, wherein the weights are formed as spheres.

20. The attenuator of claim 15, wherein the stops are capable of rotation relative to the track housing.

* * * * *